US007339639B2

(12) United States Patent
Nakano et al.

(10) Patent No.: US 7,339,639 B2
(45) Date of Patent: Mar. 4, 2008

(54) MANUFACTURING METHOD FOR ELECTROOPTIC DEVICE, ELECTROOPTIC DEVICE, AND ELECTRONIC DEVICE

(75) Inventors: Tomoyuki Nakano, Toyoshina-machi (JP); Keiji Takizawa, Hataka-machi (JP); Hideki Kaneko, Shiojiri (JP)

(73) Assignee: Seiko Epson Corporation (JP)

(*) Notice: Subject to any disclaimer, the term of this patent is extended or adjusted under 35 U.S.C. 154(b) by 28 days.

(21) Appl. No.: 10/681,820

(22) Filed: Oct. 8, 2003

(65) Prior Publication Data

US 2004/0109113 A1 Jun. 10, 2004

(30) Foreign Application Priority Data

Oct. 11, 2002 (JP) ............................ 2002-298987
Jun. 25, 2003 (JP) ............................ 2003-181318

(51) Int. Cl.
*G02F 1/1335* (2006.01)
*G02F 1/13* (2006.01)

(52) U.S. Cl. ...................... 349/106; 349/114; 349/187

(58) Field of Classification Search ................ 349/114, 349/106–108, 187
See application file for complete search history.

(56) References Cited

U.S. PATENT DOCUMENTS 6,215,538 B1 4/2001 Narutaki et al. ............ 349/106
6,704,075 B2 * 3/2004 Takizawa et al. ........... 349/106
6,885,418 B2 * 4/2005 Matsushita et al. ......... 349/113
6,909,479 B2 * 6/2005 Iijima ......................... 349/109
2002/0018159 A1 * 2/2002 Kim et al. .................. 349/106
2002/0171791 A1 11/2002 Anno et al. ................. 349/113
2004/0095528 A1 * 5/2004 Nakamura et al. .......... 349/106

FOREIGN PATENT DOCUMENTS

CN 1387074 A 12/2005
JP 2000-29012 1/2000
JP 2003-186000 7/2002
JP 2002-229010 8/2002

* cited by examiner

*Primary Examiner*—Dung T. Nguyen
(74) *Attorney, Agent, or Firm*—Harness, Dickey & Pierce, P.L.C.

(57) ABSTRACT

A transflective electrooptic device is provided with an opening formed in a colored layer provided on the reflecting section of a transflective layer. The opening has an elliptical two-dimensional shape, and can be formed, in a patterning process, by a mask pattern having a two-dimensional shape without any corners, such as an elliptical shape. Such an opening makes it possible to inhibit fluctuations in the opening shape and opening area during a patterning operation with respect to the colored layer, and reduces variations in the opening area, thereby increasing the color reproducibility of the reflective display.

5 Claims, 15 Drawing Sheets

1300P 1300P 1300P
1314ra 1314ga 1314b
1315r 1315g 1315b
R G B
1312 {1312a 1312b}
1312a
1314r 1314g 1312a 1312b 1314b 1312b
P7
1321 1321
1320a 1322a 1323 1322b 1320b

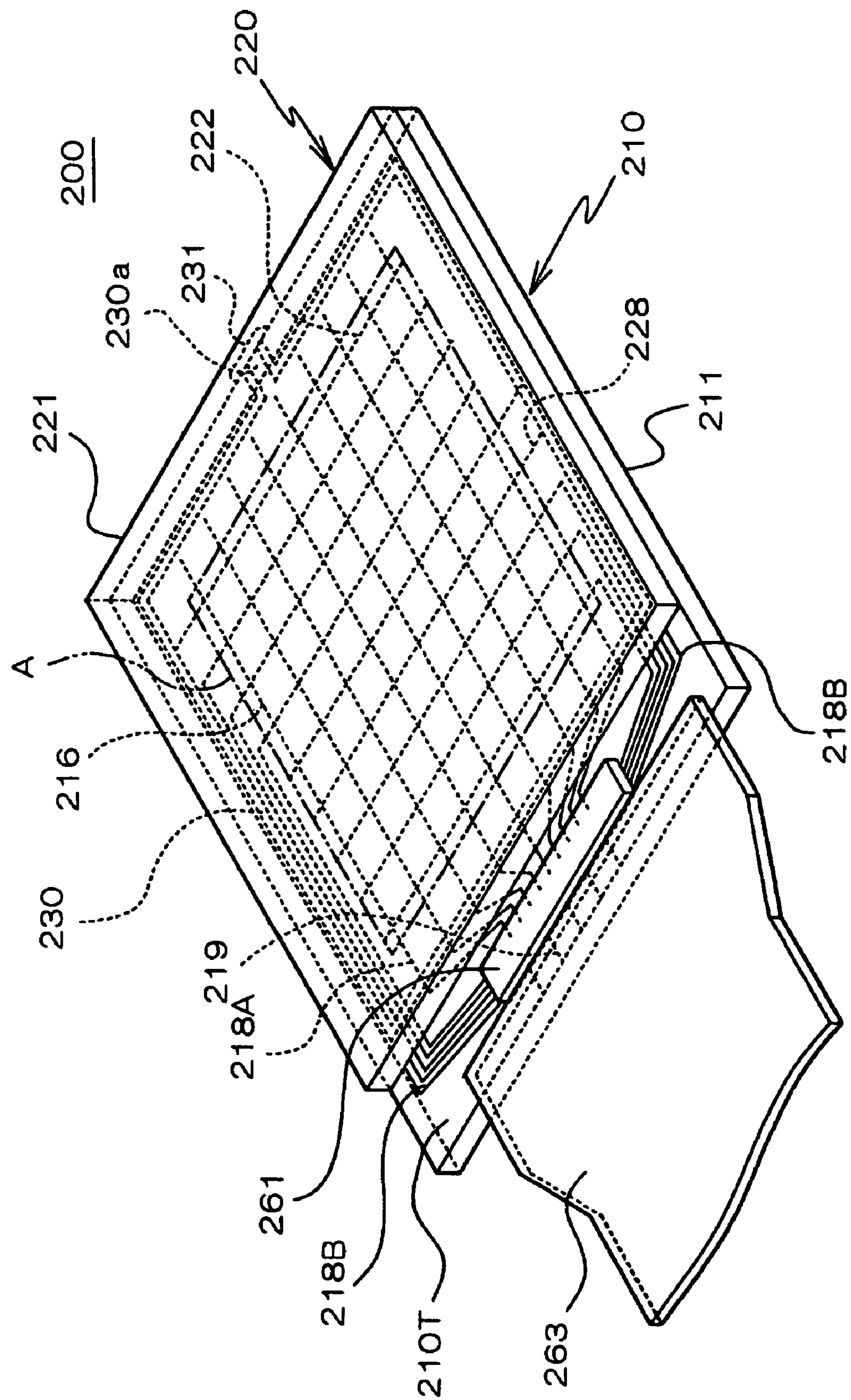
F I G . 1
200
220
222
210
230a
231
228
221
211
A
216
218B
230
219
218A
261
218B
210T
263

800P
812a
800P
812b
800P
812b
812a
814ra
814ga
814ba
R
G
815g
B
R
812
812a
812b
815r
814ra
814r
815g
814ga
814g
815b
814ba
814b
815b 820
820a 821
821a 822
822a

MANUFACTURING METHOD FOR ELECTROOPTIC DEVICE, ELECTROOPTIC DEVICE, AND ELECTRONIC DEVICE

BACKGROUND OF THE INVENTION

1. Technical Field

The present invention relates to a manufacturing method for an electrooptic device, an electrooptic device, and an electronic device. More specifically, it relates to a manufacturing method for an electrooptic device having a color filter, and the construction of the same.

2. Related Art

As is known in the art, liquid crystal displays, which are a kind of electrooptic device, generally include a transmissive liquid crystal display, which performs a transmissive display by using transmitted light emitted by illumination means such as a backlight, and a reflective liquid crystal display, which has a reflector plate reflecting external light and which performs a reflective display by using reflected light of the external light. The transmissive liquid crystal display provides a relatively bright display, but its illumination means such as a backlight requires large power consumption. This raises a problem in that, when the transmissive liquid crystal display is used for a portable electronic device such as a mobile phone, its operating time is short since the battery capacity is limited. Another problem with the transmissive liquid crystal is that its display is difficult to view while outdoors during the daytime. On the other hand, the reflective liquid crystal display requires no illumination means, but the reflective liquid crystal display does not always provide sufficient brightness for display because it makes use of external light. Therefore, the reflective liquid crystal display particularly involves a problem in that it is deficient in color reproducibility for color display and viewability in a dark place.

In view of such situations, a transflective liquid crystal display capable of switching between the transmissive display and reflective display in accordance with environmental circumstances, has been proposed (see, for example, Japanese Unexamined Patent Application Publication No. 2002-229010 (page. 5, FIG. 3)). This type of liquid crystal display has a transflective layer constituting a reflecting section that reflects external light for each pixel, and a transmitting section formed by an opening in a reflecting film. In this case, when illumination means is turned on, the illumination light passes through the transmitting section of the transflective layer to thereby implement a transmissive display, while, when the illumination means is turned off, external light is reflected by the reflecting section of the transflective layer to thereby implement a reflective display.

In order to realize a color display in the above-described transflective liquid crystal display, a color filter is provided on the observation side of the above-described reflecting layer (i.e., on the incident side of the external light).

In the above-described conventional transflective liquid crystal display with a color filter, in the transmissive display, the illumination light passing through the transmitting section in each pixel passes through the color filter only once, whereas in the reflective display, the reflective light formed by external light being reflected by the reflecting section in each pixel passes through the color filter twice during one round trip. This unfavorably causes a large difference in the color reproducibility between the transmissive display and reflective display.

As a possible structure for solving the above-described problem, there is a structure in which an opening that is two-dimensionally superimposed on a part of the reflecting section is provided in the colored layer of the color filter. For example, as shown in FIG. 12, there is provided a transflective layer 11 by forming an opening 11_a_ in the reflecting film, and a transmitting section 10PT and a reflecting section 10PR are constituted of the transflective layer 11. In each pixel 10P, an opening 12_a_ is provided in a colored layer 12 of the color filter, and a part of the reflecting section 10PR of the transflective layer 11 is exposed on the incident side of external light. This allows the chromaticity of the reflective display to be adjusted independently of that of the transmissive display, by varying the opening area of the opening 12_a_.

In order to form the above-described structure, a patterning method shown in FIG. 14 is used. First, as shown in FIG. 14(_a_), a reflective material such as aluminum is deposited on the surface of a transparent substrate 10 such as glass substrate, and as shown in FIG. 14(_b_), a transflective layer 11 having an opening 11_a_ therein is formed by patterning. Next, as shown in FIG. 14(_c_), a colored layer 12 comprising a photosensitive resist is applied over the transflective layer 11. Then, as shown in FIG. 14(_d_), this colored layer 12 is selectively exposed by using a mask 13 formed into a mask pattern having a light-shielding section 13_a_, and thereby, as shown in FIG. 14(_e_), an opening 12_a_ is formed in the colored layer 12.

In this case, however, the opening 12_a_ of the colored layer 12 is a part of the pixel 10P and an opening having an area as minute as about several micrometers to a dozen or so micrometers square, and therefore, it is difficult to accurately control the shape of the opening 12_a_ in the above-described photolithographic process to achieve high reproducibility regarding the opening area. Specifically, as shown in FIG. 13, for example, when exposure is performed using a mask with a rectangular light-shielding section 13_a_ for forming a rectangular opening in a negative-type colored layer, if a desired opening area is very small, the vicinity of the corners of the opening is susceptible to exposure due to diffracted light or the like during an exposure operation, as compared with the other portions thereof. As a result, the colored layer is apt to remain in the vicinity of the corners of the opening 12_a_ during the development operation. This makes it difficult to achieve high reproducibility regarding the opening area. Also, for the reflective display, in the opening 12_a_, light does not pass through the colored layer at all, whereas in the area other than the opening, light passes therethrough twice in a round trip. A slight change in the opening area of the opening 12_a_ would widely vary the chromaticity of the reflective display. This method, therefore, involves a problem in that the color reproducibility of the reflective display cannot be achieved due to variations in the opening area of the opening 12_a_.

Accordingly, one object of the present invention is to solve the above-described problems, and to provide a method for manufacturing a transflective electrooptic device and its structure capable of adjusting the chromaticity of the reflective display, and of improving the reproducibility of the adjusted reflective display.

SUMMARY

To solve the above-described problems, in one aspect, the present invention provides a manufacturing method for an electrooptic device that comprises a plurality of pixels each including an electrooptic material; a transflective layer constituting a reflecting section that reflects light for each pixel, and a transmitting section that allows light to pass therethrough; and a colored layer that is two-dimensionally superimposed on the transflective layer, wherein this manufacturing method includes the step of forming an opening having a two-dimensional shape having no corner in the colored layer corresponding to the reflecting section, in each of at least some of the pixels.

The present inventors have conducted a close study of variations in the opening area of the colored layer, and have found that, when patterning the colored layer by the photolithography, the opening shape is apt to be deformed in the vicinity of the corners of the opening, and that the reproducibility of the opening shape in the vicinity of the corners of the opening is low. For example, when the colored layer is a negative resist, the vicinity of the corner portions of the opening is susceptible to exposure due to diffracted light or the like as compared with the other portions thereof, and therefore, as shown in FIG. 13, the colored layer is prone to remain in vicinity of the corners of the opening 12*a* during a development operation. It is, however, very hard to control the extent to which the colored layer remains, which makes it difficult to secure the reproducibility of the opening area.

Accordingly, the inventors attempted to form an opening in the colored layer by a pattern having a two-dimensional shape without a corner. This makes it possible to reduce variations in opening shape and inhibit fluctuations in the opening area, because the pattern itself for forming the opening has a two-dimensional shape without a corner. Namely, the inhibition of fluctuations in the opening area by the formation of an opening having a two-dimensional shape without a corner, allows the color reproducibility of the reflective display to be increased, and enables the display quantity thereof to be significantly improved.

Besides the case where patterning is performed by a photolithographic method in which exposure/development is performed by using a photosensitive colored layer as described above, the case where patterning is performed by a method in which a mask is formed on the colored layer and in which etching or the like is performed via the mask, also produces the above-described effect. This is because the shape without a corner inhibits the occurrence of side etching.

The two-dimensional shape of the above-described opening may assume a circular shape, an oblong circular shape, or the like. Here, the oblong circular shape includes an elliptical shape.

Also, the two-dimensional shape of the above-described opening may be asymmetrical.

With such a feature, diffracted light is dispersed without locally concentrating during an exposure operation by forming an opening having an asymmetrical two-dimensional shape. This reduces the risk of the leaving behind the colored layer.

The two-dimensional shape of the opening may be such that the positions of the intersections of respective normals to two arbitrary tangents disperse.

With such an arrangement, diffracted light is dispersed without locally concentrating during an exposure operation, thereby reducing the risk of the leaving behind the colored layer.

In another aspect, the present invention provides a manufacturing method for an electrooptic device that comprises a plurality of pixels each including an electrooptic material; a transflective layer constituting a reflecting section that reflects light for each pixel, and a transmitting section that allows light to pass therethrough; and a colored layer that is two-dimensionally superimposed on the transflective layer, wherein this manufacturing method includes the step of forming an opening having a polygonal two-dimensional shape having only interior angles larger than 90 degrees in the colored layer corresponding to the reflecting section, in each of at least some of the pixels.

In the present invention, because the opening in the colored layer has a polygonal two-dimensional shape having only interior angles larger than 90 degrees, it is possible to reduce fluctuations in the exposure intensity in the vicinity of the corner of the pattern when the opening is formed. This reduces variations in the opening shape and inhibits fluctuations in the opening area. Furthermore, in the present invention, when the colored layer is formed of a negative resist, the use of the above-described pattern allows the avoidance of the concentration of diffracted light onto a specific position during an exposure operation, as compared with the case where a circular or elliptical pattern is used. This prevents the occurrence of remaining points in the colored layer inside the pattern due to the concentration of the diffracted light.

Also, the two-dimensional shape of the above-described opening may be asymmetrical.

With such a feature, diffracted light is dispersed without locally concentrating during an exposure operation by forming an opening having an asymmetrical two-dimensional shape. This reduces the risk of leaving behind the colored layer.

In still another aspect, the present invention provides a manufacturing method for an electrooptic device that comprises a plurality of pixels each including an electrooptic material; a transflective layer constituting a reflecting section that reflects light for each pixel, and a transmitting section that allows light to pass therethrough; and a colored layer that is two-dimensionally superimposed on the transflective layer, wherein this manufacturing method includes the step of forming an incision in the colored layer corresponding to the reflecting section, in each of at least some of the pixels.

According to the present invention, it is possible to inhibit fluctuations in the opening shape and opening area of the opening, and increase the reproducibility thereof. Specifically, as compared with the case where the opening is formed by hollowing out the colored layer, this case where the incision section is provided in the colored layer allows easy control of the opening shape and opening area, and reduces fluctuations in the opening shape and opening area, thereby providing improved reproducibility thereof. In particular, when a desired opening area is small, the shape formed by hollowing the colored layer leaves resist in the opening portion and does not allow the opening to be formed, whereas the shape formed by incising the colored layer allows an opening with a desired shape and area to be formed without leaving the resist. Therefore, particularly in the reflective display, in view of the fact that the display color significantly changes as the opening area changes, it is possible to produce a noticeable effect of significantly improving the color reproducibility of the reflective display.

In a further aspect, the present invention provides a manufacturing method for an electrooptic device that comprises a plurality of pixels each including an electrooptic material; a transflective layer constituting a reflecting section that reflects light for each pixel, and a transmitting section that allows light to pass therethrough; and a colored layer that is two-dimensionally superimposed on the transflective layer, wherein this manufacturing method includes the step of forming an opening in the colored layer corresponding to the reflecting section in each of at least some of the pixels, and wherein the opening has a shape such that the positions of the intersections of respective normals to two arbitrary tangents on the outer periphery of the opening disperse.

With such a feature, diffracted light is dispersed without locally concentrating during an exposure operation. This makes it possible to reduce the risk of leaving behind the colored layer, decrease variations in the opening shape, and inhibit fluctuations in the opening area.

In a yet further aspect, the present invention provides an electrooptic device that includes a plurality of pixels each including an electrooptic material; a transflective layer constituting a reflecting section that reflects light for each pixel, and a transmitting section that allows light to pass therethrough; and a colored layer that is two-dimensionally superimposed on the transflective layer, wherein, in each of at least some of the pixels, an opening is formed in a position that is superimposed on at least a part of the reflecting section in the colored layer, and wherein the opening has a two-dimensional shape crossing the pixel.

According to the present invention, since the opening in the colored layer has a two-dimensional shape crossing the pixel, it is possible to form the opening into a two-dimensional shape having no corner in the portions other than the boundary region, (i.e., within the pixel), or it is possible to form the opening into a shape such as not to generate the concentration of diffracted light, side etching, or the like in the pixel during a patterning operation. This allows fluctuations in the opening shape in the opening to be inhibited, and enables variations in the opening area thereof to be suppressed, thereby improving the color reproducibility of the reflective display.

In the present invention, it is preferable that the opening have a two-dimensional shape having no corner in the portions other than the boundary region between the pixels. This further improves the reproducibility of the opening area. Here, the opening is preferably formed into a band shape crossing the pixel.

In the present invention, it is preferable that the opening provided in one of the pixels be disposed with respect to the opening provided in another of the pixels adjacent thereto so that they do not adjoin each other with the boundary region between the one of the pixels and the other of the pixels therebetween. This eliminates the openings of adjacent pixels adjoining to each other with the boundary region therebetween, thereby inhibiting the reduction in the contrast of the reflective display. For example, the boundary region between pixels is usually a non-driving region for an electrooptic material, and therefore, if the openings of both pixels are adjacent to each other, the amount of reflected light from the non-driving boundary region increases, thereby relatively reducing the contrast. In contrast to this, if the openings of both pixels are not adjacent to each other with the boundary region therebetween, the amount of reflected light from the boundary region can be reduced because there exists a colored layer on at least one side of the boundary region.

In another aspect, the present invention provides an electrooptic device including a plurality of pixels each including an electrooptic material; a transflective layer constituting a reflecting section that reflects light for each pixel, and a transmitting section that allows light to pass therethrough; and a colored layer that is two-dimensionally superimposed on the transflective layer, wherein, in each of at least some of the pixels, the colored layer corresponding to the reflecting section has an incision section to become an opening; and wherein the opening provided in one of the pixels is disposed with respect to the opening provided in another of the pixels adjacent thereto so that they do not adjoin each other with the boundary region between the one of the pixels and the other of the pixels therebetween.

According to the present invention, as compared with the case where the opening is formed by hollowing out the colored layer, such formation of an opening by incising an end of the colored layer allows fluctuations in the opening shape and variations in the opening area to be inhibited, thereby providing improved reproducibility of the reflective display. Furthermore, by disposing the openings of pixels adjacent to each other so as not to adjoin each other with the boundary region therebetween, the reduction in the contrast of the reflective display can be inhibited. For example, the boundary region between pixels is usually a non-driving region of an electrooptic material, and therefore, if the openings of both pixels are adjacent to each other, the amount of reflected light from the non-driving boundary region increases, thereby relatively reducing the contrast. In contrast to this, if the openings of both pixels are not adjacent to each other with the boundary region therebetween, the amount of reflected light from the boundary region can be reduced because there exists a colored layer on at least one side of the boundary region.

In a still another aspect, the present invention provides an electronic device including an electrooptic device manufactured by the above-described manufacturing method for an electrooptic device, or the above-described electrooptic device; and control means for controlling the electrooptic device. An example of this electronic device is a mobile phone, portable information terminal, electronic watch, or the like.

BRIEF DESCRIPTION OF THE DRAWINGS

FIG. 1 is a schematic perspective view of the overall construction of an electrooptic device according to the present invention.

DETAILED DESCRIPTION

Hereinafter, a manufacturing method for an electrooptic device, an electrooptic device, and an electronic device according to embodiments of the present invention will be described in detail with reference to the accompanying drawings. In the embodiments of the present invention, descriptions are made taking the case where a liquid crystal display is formed as an electrooptic device as example.

Figure 2:
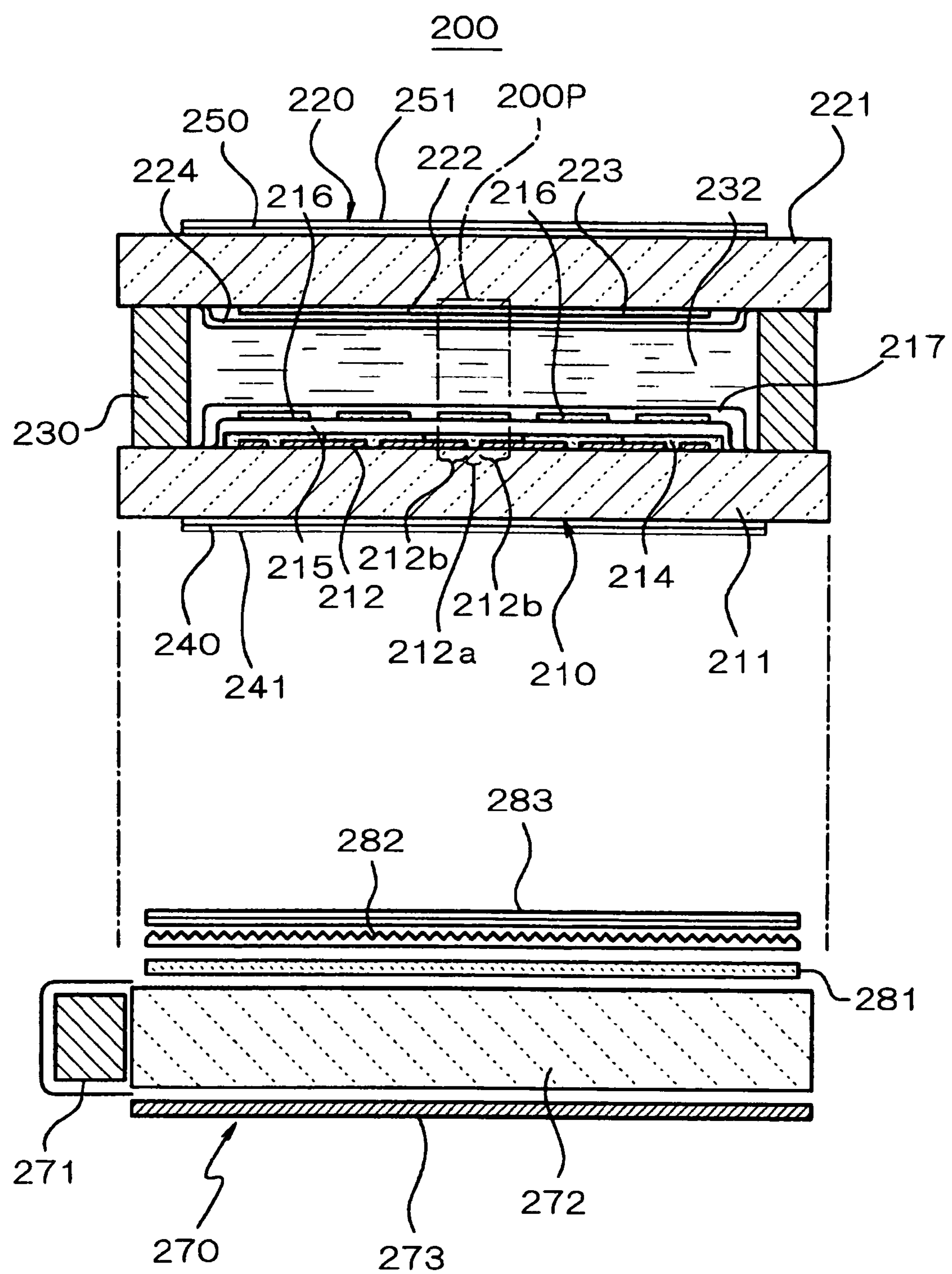
FIG. 2 is a schematic longitudinal sectional view of the sectional structure of the electrooptic device according to the present invention.

FIG. 1 is a schematic perspective view of the external appearance of a liquid crystal panel 200 constituting an electrooptic device according to an embodiment of the present invention. FIG. 2 is a schematic enlarged sectional view of one portion of a display area A of the liquid crystal panel 200.

This electrooptic device is formed by mounting an illumination device such as a backlight 270 as shown in FIG. 2 and a case member as required, with respect to the liquid crystal panel 200 shown in FIG. 1 which has a so-called transflective type passive matrix structure.

As shown in FIG. 1, the liquid crystal panel 200 is formed into a cell structure by laminating together, via a sealing member 230, a color filter substrate 210 using a transparent first substrate 211 as a base member constituted of a glass plate, a synthetic resin plate or the like, and an opposed substrate 220 opposed to this color filter substrate 210 and using a second substrate 221 similar to the first substrate as a base member, then injecting a liquid crystal 232 (see FIG. 2) inside the sealing member 230 through an injection port 230*a*, and thereafter completely sealing the liquid crystal 232 with a sealant 231.

On the inner surface of the first substrate 211 (i.e., on the surface opposed to the second substrate 221), a plurality of transparent electrodes 216 are arranged in stripes parallel to each other, and on the inner surface of the second substrate 221, a plurality of transparent electrodes 222 are arranged in stripes parallel to each other. The transparent electrodes 216 are electrically connected to wiring 218A, and the transparent electrodes 222 are electrically connected to wiring 228. The transparent electrodes 216 and the transparent electrodes 222 orthogonally intersect mutually, and the intersecting regions thereof constitute large numbers of pixels arranged in a matrix configuration. This pixel array constitutes the display region A.

The first substrate 211 has a substrate extending portion 210T extending further outward than an outer edge of the second substrate 221. On the substrate extending portion 210T, there are provided wiring 218B electrically connected to the aforementioned wiring 218A and wiring 228 through upper and lower conductive portions, respectively, formed of a part of the sealing member 230, and an input terminal section 219 comprising a plurality of wiring patterns independently formed. Also, on the substrate extending portion 210T, a semiconductor IC chip 261 incorporating a liquid crystal driving circuit and the like is mounted so as to be electrically connected to the wiring 218A, wiring 218B, and input terminal section 219. Furthermore, a flexible wiring substrate 263 is mounted on the end of the substrate extending portion 210T so as to be electrically connected to the input terminal section 219.

As shown in FIG. 2, in the liquid crystal panel 200, a phase difference plate (¼ wavelength plate) 240 and a polarizing plate 241 are provided on the outer surface of the first substrate 211, and a phase difference plate (¼ wavelength plate) 250 and a polarizing plate 251 are provided on the outer surface of the second substrate 221.

A backlight 270 shown in FIG. 2 includes a light source 271 constituted of LED (light-emitting diode) or the like, a light guide plate 272 constituted of a transparent material such as an acryl resin, and a reflector plate 273 disposed behind the light guide plate 272. On the front side of the light guide plate 272, there is provided a dispersion plate 281, and further on the front side of the dispersion plate 281, there are provided light condensing plates 282 and 283. The light condensing plates 282 and 283 are for increasing the directivity of the illumination light of the backlight 270.

Next, the structure of the color filter substrate 210 will be described in detail with reference to FIG. 2. A transflective layer 212 is formed on the surface of the first substrate 211, and it has a transmitting section 212*a* open for each pixel 200P. In the transflective layer 212, the portion other than the transmitting section 212*a* is substantially a reflecting section 212*b* that reflects light. In the present invention, the transflective layer 212 constitutes the transmitting section 212*a* and the reflecting section 212*b* for each pixel 200P. Here, the transflective layer 212 may be formed for each of the pixels 200P, or alternatively, it may be integrally formed over the entire display region A (see FIG. 1) in a manner such that the transmitting section 212*a* is provided for each of the pixels 200P.

A colored layer 214 is formed over the transflective layer 212, and a surface protective layer (overcoat layer) 215 constituted of a transparent resin or the like covers the colored layer. These colored layer 214 and surface protective layer 215 constitutes a color filter.

The colored layer 214 is usually treated as exhibiting a predetermined color tone by dispersing coloring materials such as pigments or dyes into a transparent resin. An example of the color tone of the colored layers is such that is constituted of a set of three colors: R (red), G (green), and B (blue) with primary color filters. However, the way of forming a color tone is not limited to this method. The color tone of the colored layer can also be formed by using complementary colors or other various color tones. Usually, a coloring resist constituted of a photosensitive resin comprising coloring materials such as pigments or dyes is applied to the surface of the substrate, and unnecessary portions are removed by a photolithography, whereby a colored layer having a predetermined color pattern is formed. Here, when a plurality of color tones are to be formed, the above-described process is repeated.

Figure 3:
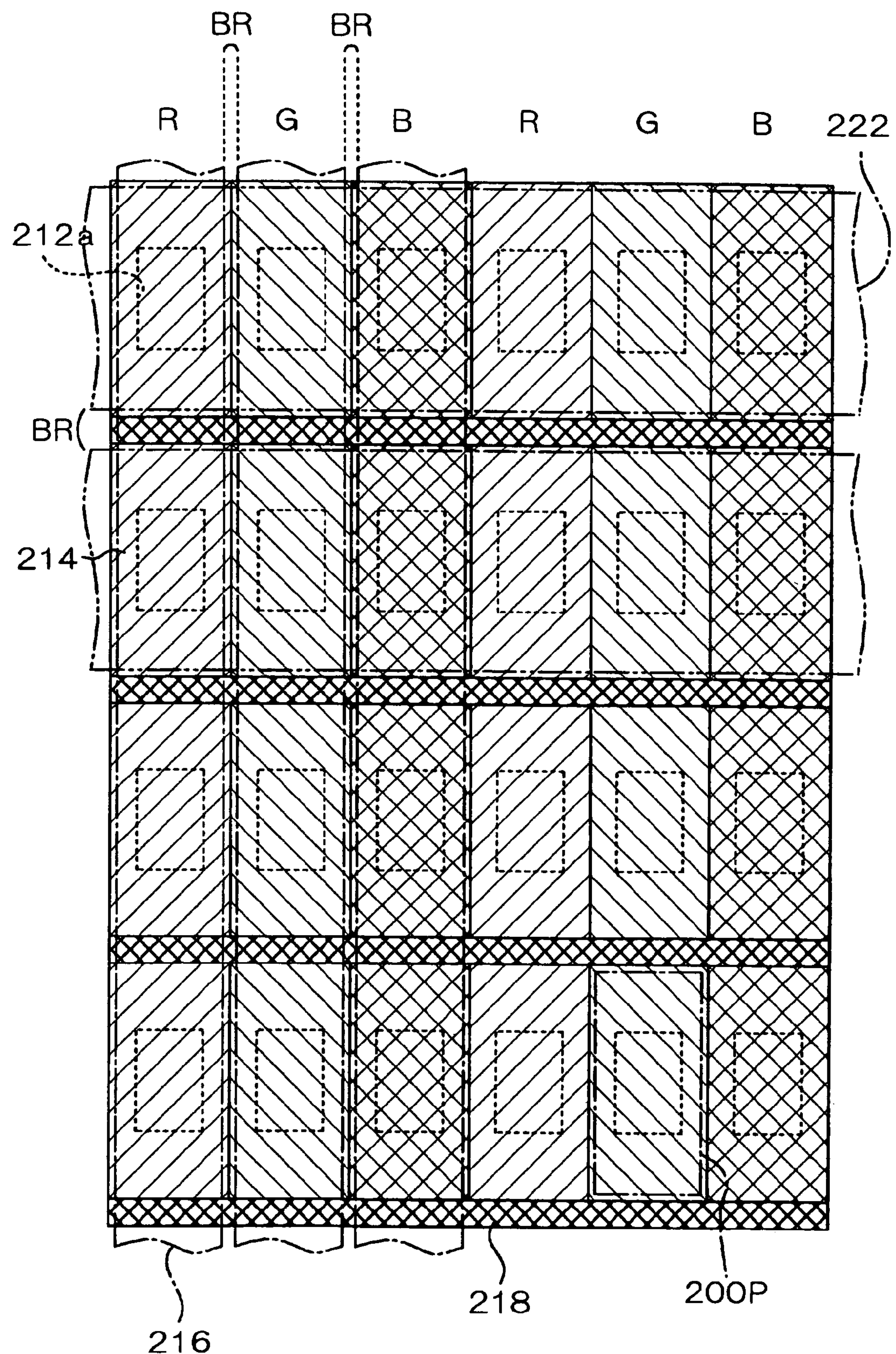
FIG. 3 is a plan view of an array pattern of colored layers of a color filter according to the present invention.

FIG. 3 shows an array pattern of colored layers of a color filter arranged as described above. In this embodiment, stripe-array color filters, in which band-like colored layers 214 of R, G, and B are arranged in stripes. Black stripeshaped light-shielding layers 218 are formed between pixels 200P adjacent to each other in the up-and-down direction (in FIG. 3) of the colored layers 214. The light-shielding layer 218 is formed of a black resin layer or the like.

In the illustrated example in FIG. 3, as an array pattern of the colored layer, a stripe array is adopted. However, besides the stripe array, various pattern shapes, such as a delta array or slant mosaic array, can also be adopted. Also, in this embodiment, in some of the pixels 200P, an opening or openings described later are formed in respective colored layers, but the openings are omitted in FIGS. 2 and 3 from illustration.

Returning to FIG. 2, transparent electrodes 216 each including a transparent conductive member such as ITO (indium tin oxide) are formed on the surface protective layer 215. Each transparent electrode 216 is formed into a band shape extending in the up-and-down direction in FIG. 3. A plurality of transparent electrodes 216 are arranged in stripes parallel to each other. An alignment film 217 formed of a polyimide resin or the like is formed over the transparent electrodes 216.

On the other hand, in the above-described liquid crystal panel 200, the opposed substrate 220 opposed to the color filter substrate 210 is formed by sequentially stacking the transparent electrodes 222 that is the same as the above-described one, a hard protective film 223 constituted of $SiO_2$, $TiO_2$, or the like, and an alignment film 224 that is the same as the above-described one, in this order on the second substrate 221.

As shown in FIG. 3, the pixels 200P arranged on the display region A shown in FIG. 1, are constructed as a planar range in which the transparent electrodes 216 and the transparent electrodes 222 mutually intersect. Between the pixels 200P, there are boundary regions BR that are not sandwiched between the transparent electrodes 216 and the respective transparent electrodes 222. A part of each of the boundary regions BR is shielded from light by the above-described light-shielding layer 218. In this embodiment, as shown in FIG. 3, the boundary regions BR between the pixels 200P adjacent to each other in up-and-down direction in FIG. 3 are each shielded from light by the light-shielding layer 218, but the boundary regions BR between the pixels 200P adjacent to each other in right-and-left direction in FIG. 3 are not shielded from light.

Figures 15A, 15B, 15C, 15D:
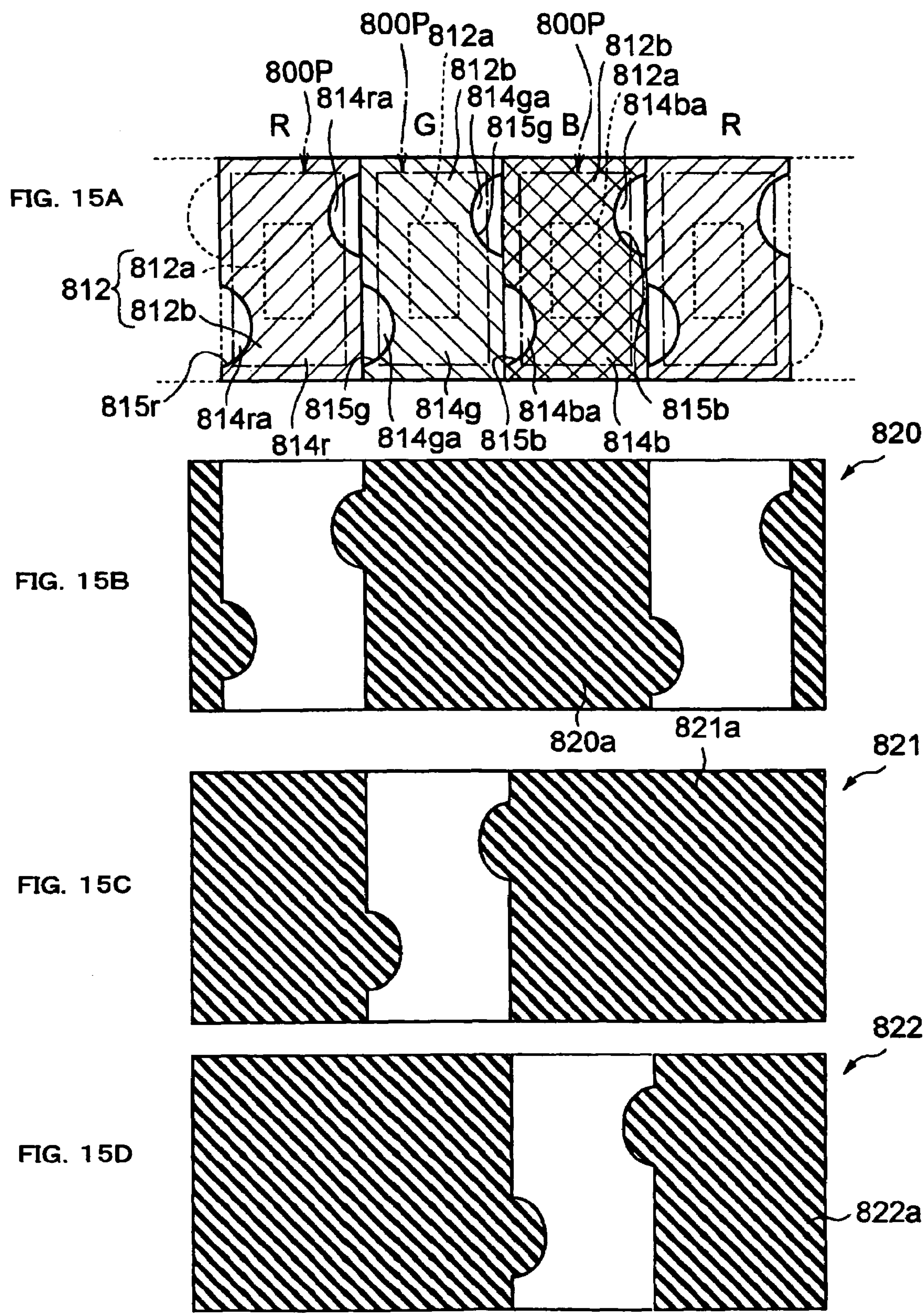
FIG. 15(*a*) to (*d*) is a representation of the shapes of colored layers and masks according to a fourth embodiment.

The foregoing describes the overall construction of the electrooptic device in the present invention. Hereinafter, more detailed descriptions will be made, with reference to FIGS. 4 to 11, and FIGS. 15 to 20, of pattern shapes of color filters. Here, FIGS. 4 to 11 show pattern shapes of respective colored layers in pixels, in a schematic manner. Therefore, even in the case where a plurality of pixels (for example, three pixels corresponding to colors R, G, and B) are represented in these figures, the patterns depicted in the figures do not represent relative array patterns or two-dimensional shapes of the boundary regions between pixels. FIG. 15(*a*) and FIGS. 16 to 20 show pattern shapes of colored layers in pixels and the peripheries thereof.

First Embodiment

Figure 4:
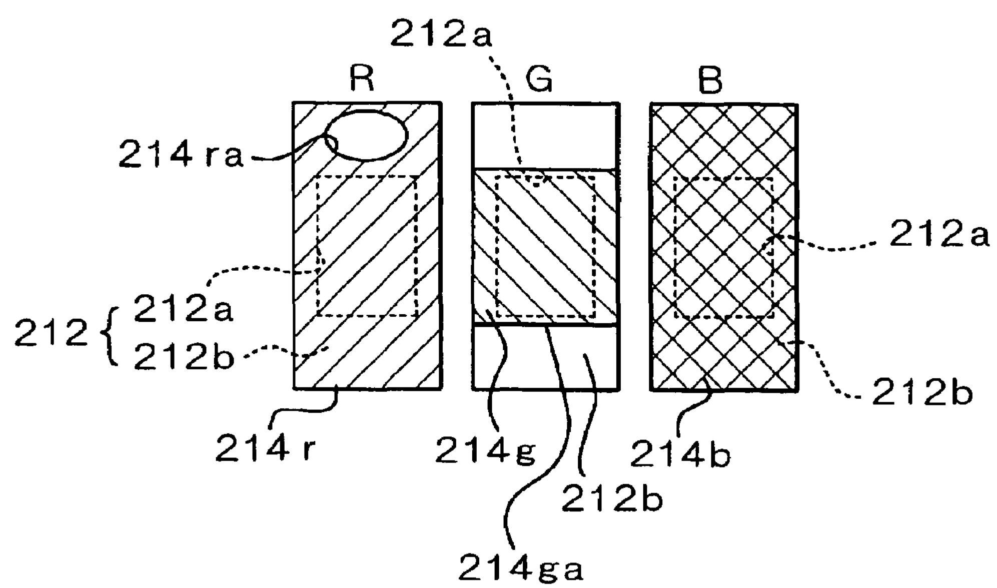
FIG. 4 is a representation of shapes of the respective colored layers in pixels according to a first embodiment of the present invention.

FIG. 4 illustrates the two-dimensional shapes of colored layers 214 in respective pixels in a first embodiment according to the present invention. In the first embodiment, colored layers 214*r*, 214*g*, and 214*b*, respectively, are formed in a plurality of pixels of R, G, and B. An opening 214*ra* is formed in the colored layer 214*r* provided for the R (red) pixel, and an opening 214*ga* is formed in the colored layer 214*g* provided for the G (green) pixel. No opening is formed in the colored layer 214*b* provided for the B (blue) pixel. With these arrangements, a part of the reflecting section 212*b* of the transflective layer 212 that is two-dimensionally superimposed on the colored layer 214*r* is not covered with the colored layer 214*r*, but is in an exposed state. Also, parts of the reflecting section 212*b* of the transflective layer 212 that is two-dimensionally superimposed on the colored layer 214*g* is not covered with the colored layer 214*g*, but are in exposed states.

The above-described arrangements can be formed by the same method in the patterning process shown in FIG. 14. However, when the patterning process shown in FIG. 14 is to be performed, mask patterns corresponding to masks 13 each having the light-shielding section 13*a* are used as shapes corresponding to the above-described openings 214*ra* and 214*ga*. For example, the two-dimensional shape of the opening 214*ra* is an elliptical shape, and this is implemented by performing patterning with a mask pattern having a two-dimensional shape such as an elliptical shape. For example, when the colored layer as shown in FIG. 14 is formed of a negative resist, the shape of the light-shielding section 13*a* is formed as an elliptical shape. Here, the application of the present invention is not limited to the case where a colored layer is formed of a negative resist. The present invention can adopt various methods of patterning the colored layer with a predetermined pattern for forming the opening in the colored layer.

Figure 12:
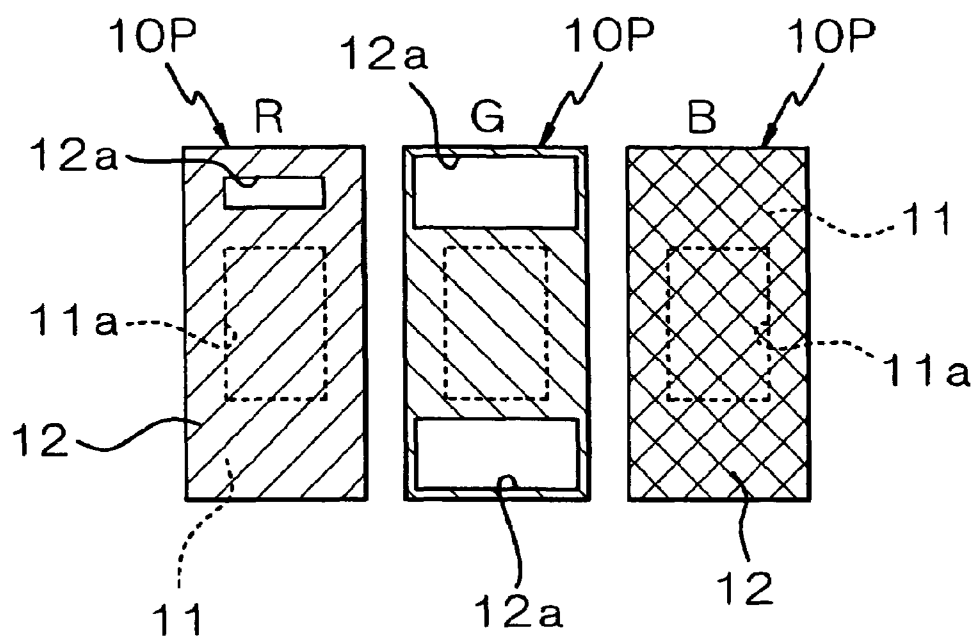
FIG. 12 is a representation of the formation states of colored layers having rectangular openings.
Figure 13:
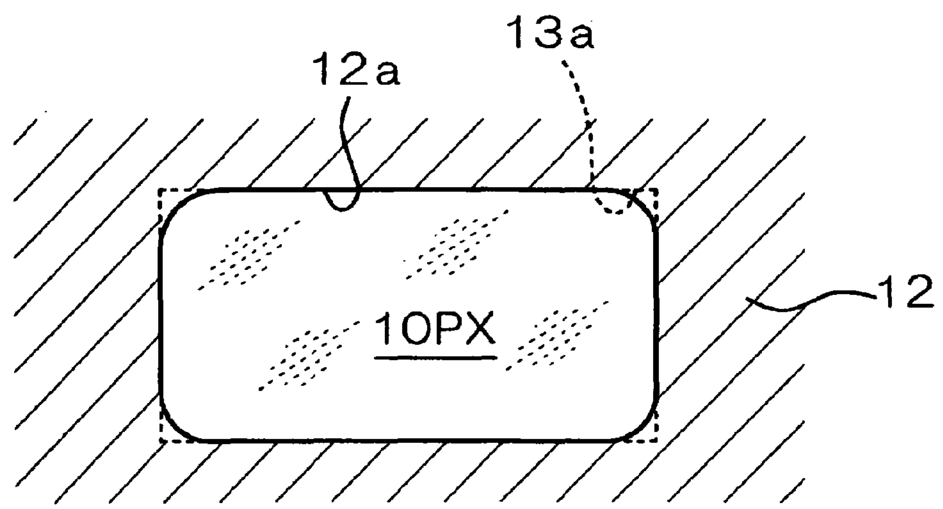
FIG. 13 is an enlarged plan view of the shape of an opening for illustrating the shape in more detail.
Figure 14A:
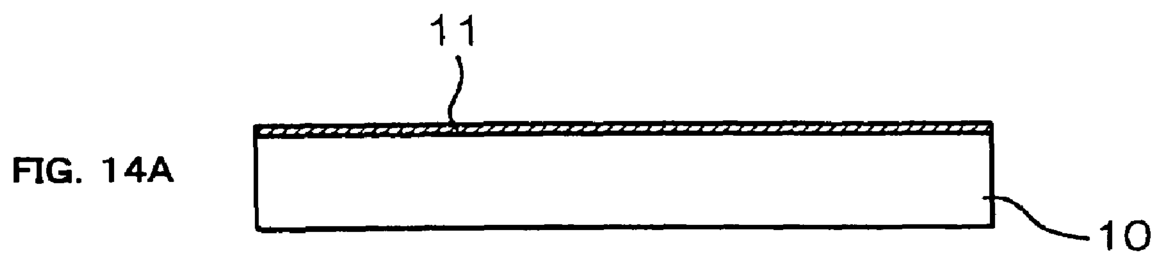
FIG. 14(*a*) to (*e*) is a representation of a patterning process for forming an opening in colored layers.
Figure 14B:
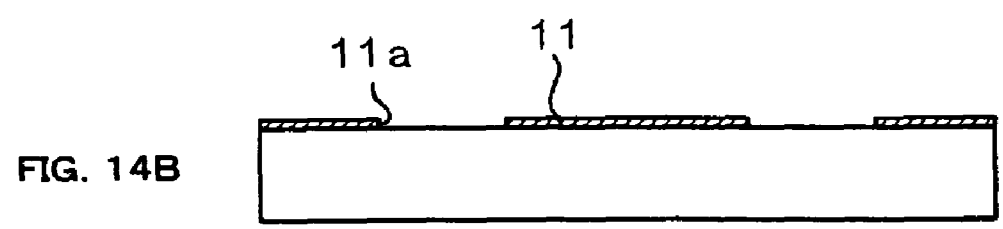
Figure 14C:
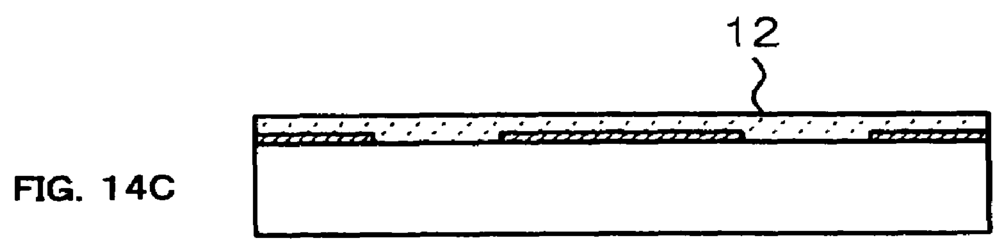
Figure 14D:
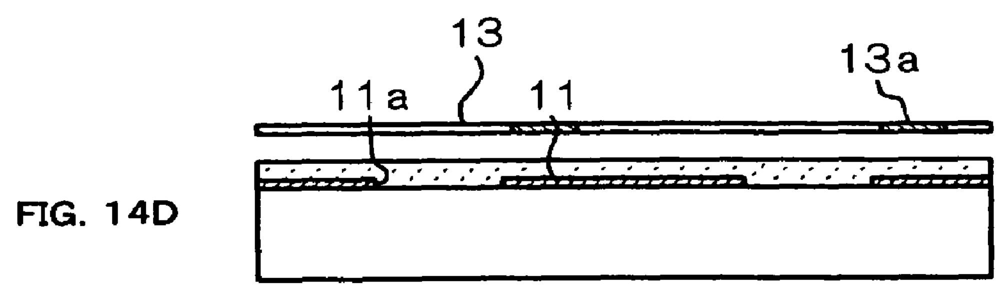
Figure 14E:
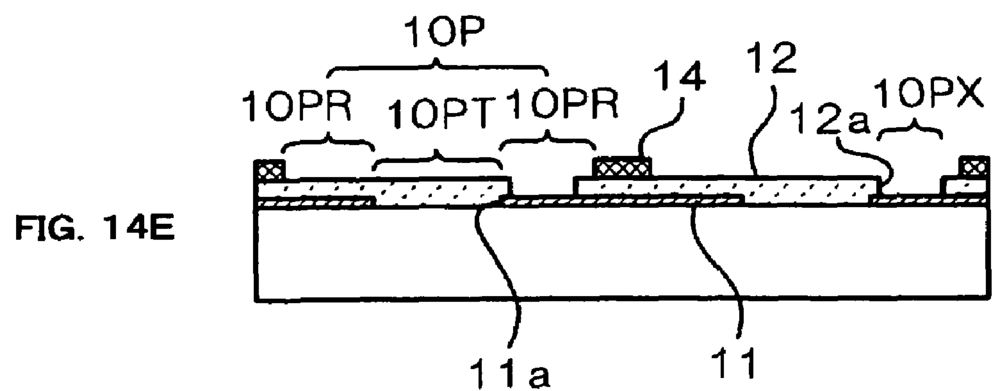

As compared with the case where there is provided the opening having a two-dimensional shape with corners as shown in FIGS. 12 and 13, such formation of the opening 214*ra* with a mask pattern without any corners makes it possible to reduce fluctuations in the opening shape and opening area during an patterning operation with respect to the colored layer 214, and to increase the reproducibility thereof. In particular, in the reflective display, the display color significantly changes as the opening area changes, and therefore, in the first embodiment, it is possible to produce a noticeable effect of significantly improving the color reproducibility of the reflective display.

The opening 214*ga* can be formed by using mask patterns each having a band-like two-dimensional shape that crosses a pixel. In this case, even though the openings 214*ga* are each formed into a rectangular shape as shown in the FIG. 4, fluctuations in the opening shape and opening area are reduced and thereby excellent reproducibility thereof is provided, since the corners of each of the openings 214*ga* in the colored layer 214*g* are situated on the boundary line of the pixel (the line showing the boundary between the pixel 200P and the boundary area BR, as shown in FIG. 3). Furthermore, by forming each of the openings 214*ga* into a pattern extended up to the inside of the boundary region BR (see FIG. 3) between pixels, the arrangement can be configured so that the corners of each of the openings 214*ga* do not substantially exist in the pixel. This further reduces fluctuations in the opening shape and opening area.

Figure 5:
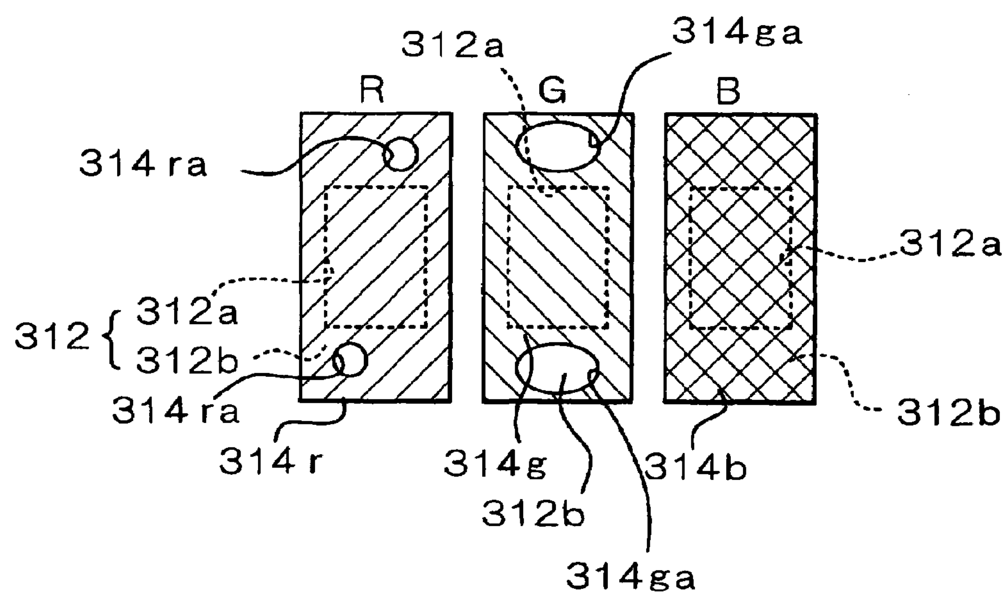
FIG. 5 is a representation of a modification of the first embodiment.

The arrangements in FIG. 5 are a modification of the first embodiment. In this modification, openings 314*ra* are provided in the colored layer 314*r*, each with a pattern having a circular two-dimensional shape, and openings 314*ga* each having an elliptical two-dimensional shape are provided in the colored layer 314*g*. The openings 314*ra* and 314*ga* partially expose the respective reflecting section 312*b* of the transflective layer 312 so as not to be covered with the colored layer 314. This modification also reduces fluctuations in the opening shape and opening area of the openings 314*ra* and 314*ga*, thereby increasing the color reproducibility of the reflective display.

In the above-described examples shown in FIGS. 4 and 5, the opening areas of the openings 214*ga* and 314*ga*, which partially expose the reflecting section 212*b* and 312*b*, respectively, are the largest in the G (green) pixel, and the opening areas of the openings 214*ga* and 314*ra*, which partially expose the reflecting section 212*b* and 312*b*, respectively, are smaller in the R (red) pixel. Since the reflective display is generally formed of reflected light that passes through the colored layer twice, the reflective display exhibits higher chroma than that of the transmissive display. However, in this manner, by causing the respective opening areas in the colored layer 214*g* and 314*g* to be larger in the G (green) pixel than in the other pixels, the ratio of the amount of reflected light that is reflected without passing through the colored layer in the G pixel increases. This reduces the difference in chromaticity between the reflective display and the transmissive display.

Second Embodiment

Figure 6:
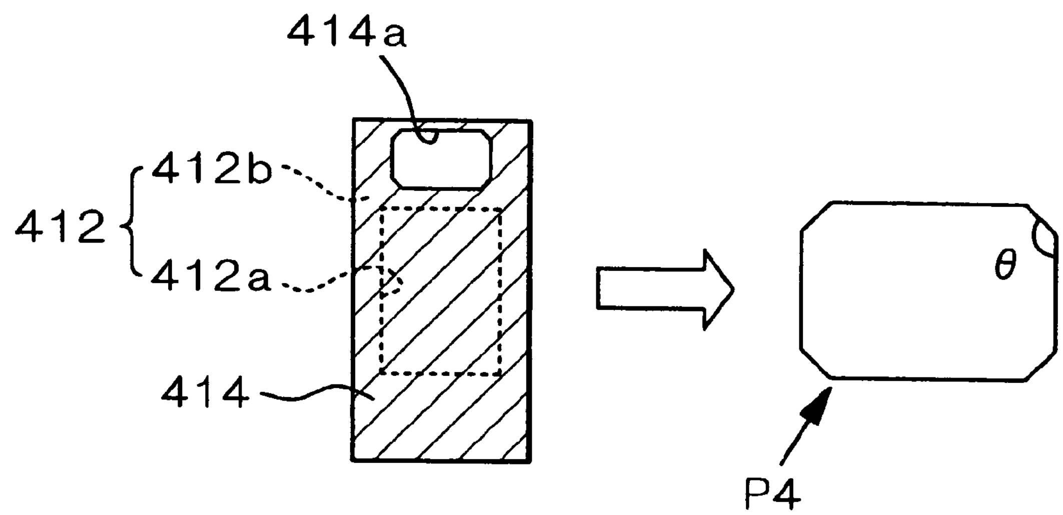
FIG. 6 is a representation of the shape of the colored layer in a pixel according to a second embodiment of the present invention.

Next, a second embodiment will be described with reference to FIG. 6. In the second embodiment, an opening 414*a* having a polygonal two-dimensional shape is provided in a colored layer 414 in a pixel. More specifically, the opening 414*a* is formed by using a mask pattern P4 having an octagonal two-dimensional shape that is formed by chamfering four corners of a rectangular shape. Here, the mask pattern P4 has eight corners, and the interior angle θ of each of these corners is an angle larger than 90 degrees (i.e., an obtuse angle). Particularly in order to effectively reduce variations in the opening shape and opening area, it is preferable that every interior angle be not less than 110 degrees.

In this way, using the polygonal mask pattern P4 in which the interior angle θ of each of the corners thereof is an obtuse angle makes it possible to inhibit fluctuations in the opening shape and opening area and increase the reproducibility thereof, as compared with the conventional methods shown in FIGS. 12 and 13. Specifically, if the above-described interior angle θ is 90 degrees or less, the shape of the opening is apt to be deformed and the opening area thereof is prone to vary due to diffraction of light, side etching, or the like during an exposure operation. However, if the interior angle θ is an obtuse angle larger than 90 degrees, especially 110 degrees or more, the diffraction of light, side etching or the like rarely occurs, thereby reducing variations in the opening shape and opening area.

Figure 10:
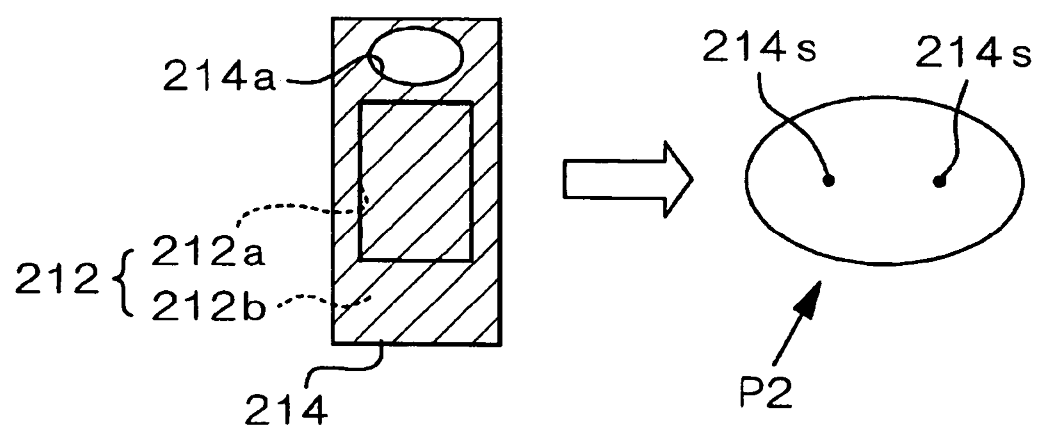
FIG. 10 is a representation of a mask pattern P2 according to the first embodiment.
Figure 11:
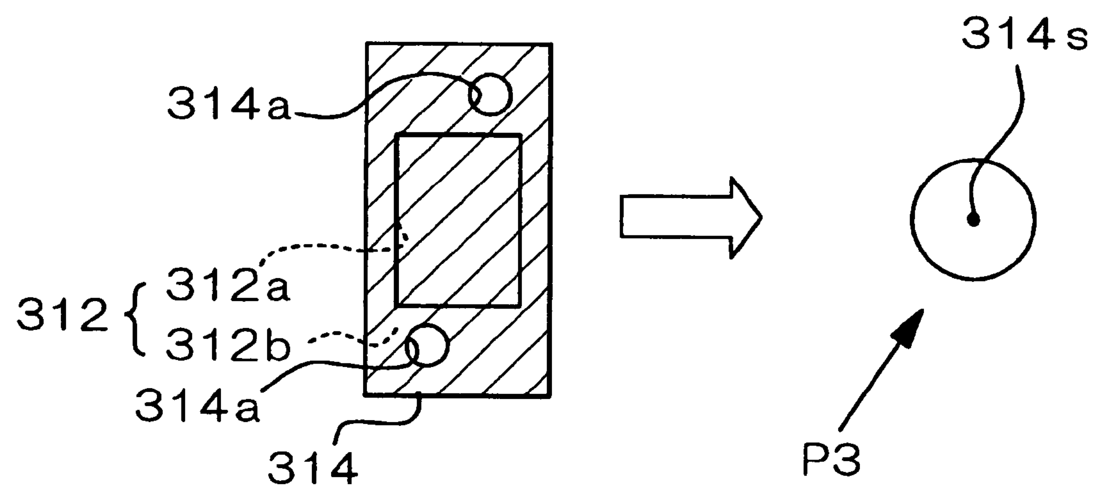
FIG. 11 is a representation of a mask pattern P3 according to a modification of the first embodiment.

As shown in FIGS. 10 and 11, when the elliptical opening 214*a* or circular openings 314*a*, respectively, are provided in the colored layers 214 and 314, and especially when there is provided a process in which exposure is performed using a negative resist, diffracted light concentrates on the focus positions 214*s* of the ellipse or the central position 314*s* of the circle, because an elliptical mask pattern P2 or a circular mask pattern P3 has a size of a several micrometers to a dozen or so micrometers. This unfavorably causes the colored layers 214 and 314 to remain in the vicinity of the focus positions 214*s* or the central position 314*s*, respectively.

In contrast, since the mask pattern for forming the opening 414*a* according to the second embodiment is formed into a polygonal two-dimensional shape, diffracted light disperses without concentrating on one spot during above-described patterning operation, thereby reducing the risk of leaving behind the colored layers as described above.

Figure 7:
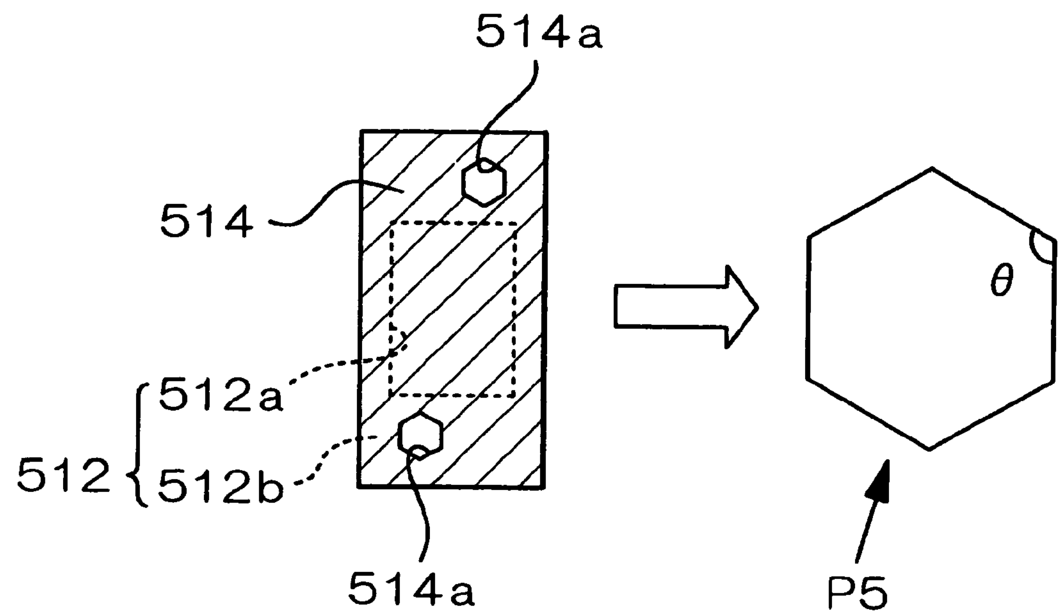
FIG. 7 is a representation of a modification of the second embodiment.

FIG. 7 illustrates a modification of the second embodiment. In this modification, openings 514*a* are formed in a colored layer 514, in the position where the colored layer 514 are superimposed on the reflecting section 512*b* of a transflective layer 512. The opening 514*a* is formed by a mask pattern P5 having a polygonal two-dimensional shape. The mask pattern P5 has substantially a regular hexagonal two-dimensional shape, and every interior angle thereof is approximately 120 degrees.

In each of the above described second embodiment and modification thereof, it is essential only that the interior angle θ of every corner is formed as an obtuse angle, but it is desirable that the interior angle θ is as large as possible in reducing variations in the opening shape and opening area. However, in order to increase the interior angle θ, it is necessary to increase the number of corners of a polygonal shape. Increasing the number of corners causes the edge shape of an opening to approach an arc or elliptical arc shape, and thereby diffracted light becomes apt to concentrate on an specified spot during an exposure operation. Considering all the above-described factors involved, it is desirable that the polygonal two-dimensional shape of a mask pattern have approximately 6 to 10 corners.

Third Embodiment

Figure 8:
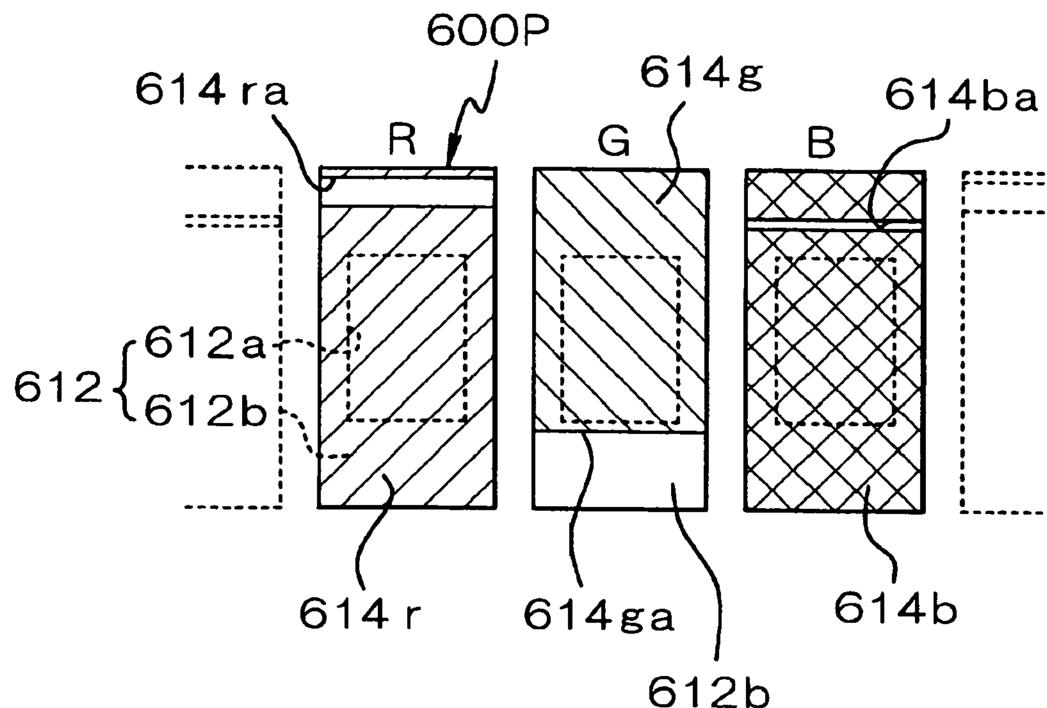
FIG. 8 is a representation of the shapes of the respective colored layers in pixels according to a third embodiment of the present invention.

Next, a third embodiment according to the present invention will be described with reference to FIG. 8. In the third embodiment, an opening 614*ra* is formed in a colored layer 614*r*, an opening 614*ga* is formed in a colored layer 614*g*, and an opening 614*ba* is formed in a colored layer 614*b*. Each of the 614*ra*, 614*ga*, and 614*ba* is configured to cross a pixel 600P. Specifically, each of the openings 614*ra*, 614*ga*, and 614*ba* is arranged to extend from a portion on the boundary line of the pixel 600P and arrive at another portion of the boundary line. In the illustrated example, pixels each having a substantially square two-dimensional shape are formed, and each of the pixels 600P has four side edges. In this embodiment, each case has an opening formed so as to cross at least two different side edges of the pixel 600P. Therefore, not only the case where the opening crosses the pixel 600P in the right-and-left direction (in FIG. 8) as the illustrated example, but also the case where the opening crosses the pixel 600P in the up-and-down direction (in FIG. 8) and the case where the opening crosses the pixel 600P in a slanting direction are included in this embodiment. Furthermore, in the case where the opening crosses the pixel 600P in a slanting direction, a configuration in which an opening is formed as a triangular shape in the vicinity of a corner of the pixel 600P is included in the present embodiment.

With such features, the corners of an opening in the pixel 600P come to be disposed on the boundary line of the pixel 600P, and therefore, during a patterning operation with respect to a colored layer for providing an opening, fluctuations in the opening shape and opening area are suppressed and variations in the opening area are reduced, thereby increasing the color reproducibility of the reflecting display. Furthermore, by forming an opening in the colored layer so as to extend up to the inside of the boundary region BR (see FIG. 3) situated outside the pixel 600P, the arrangement can also be configured so that the corners of the opening do not substantially exist in the pixel 600P. This further reduces fluctuations and variations in the opening area.

In this embodiment, the opening 614*ra* in the pixel 600P having the colored layer 614*r* provided therefore, and the adjacent opening 614*ga* in the pixel having the colored layer 614*g* provided therefore, are configured not to adjoin each other with the boundary region BR (see FIG. 3) between the two pixels therebetween. Specifically, in the illustrated example, the openings 614*ra* and 614*ga* are formed in the positions spaced apart from each other in the up-and-down direction in FIG. 8. Likewise, the openings 614*ga* and 614*ba* are formed in the positions spaced apart from each other in the up-and-down direction in FIG. 8 so as not to adjoin each other with the boundary region therebetween. Moreover, the openings 614*ba* and 614*ra* are formed in the positions spaced apart from each other in the up-and-down direction in FIG. 8 so as not to adjoin each other with the boundary region therebetween.

As described above, in the third embodiment, by forming the respective openings of the colored layers provided in pixels mutually adjacent so as not to adjoin each other with the boundary region therebetween, the arrangement is configured to prevent the occurrence of the event that no colored layer exists in the boundary layer and no colored layer exists on either side the boundary layer.

However, the boundary region BR shown in FIG. 3 is situated outside the region where a pair of transparent electrodes 216 and 222 are opposed to each other, and therefore, it is a non-driving region where a regular electric field is not sufficiently applied to an electrooptic material (liquid crystal). In this boundary region, therefore, on-off control of display cannot be sufficiently performed, and some leakage of light always occurs. As a result, if openings are provided on both sides of the boundary region, the ratio of the light amount emitted from the boundary region with respect to the light amount emitted from the pixel, which contributes to the display, relatively increases, thereby causing the reduction in the contrast in the reflective display. In this embodiment, by forming the respective openings in pixels mutually adjacent so as not to adjoin each other with the boundary region therebetween, it is possible to inhibit the reduction in the contrast in the reflective display as described above.

Figure 9:
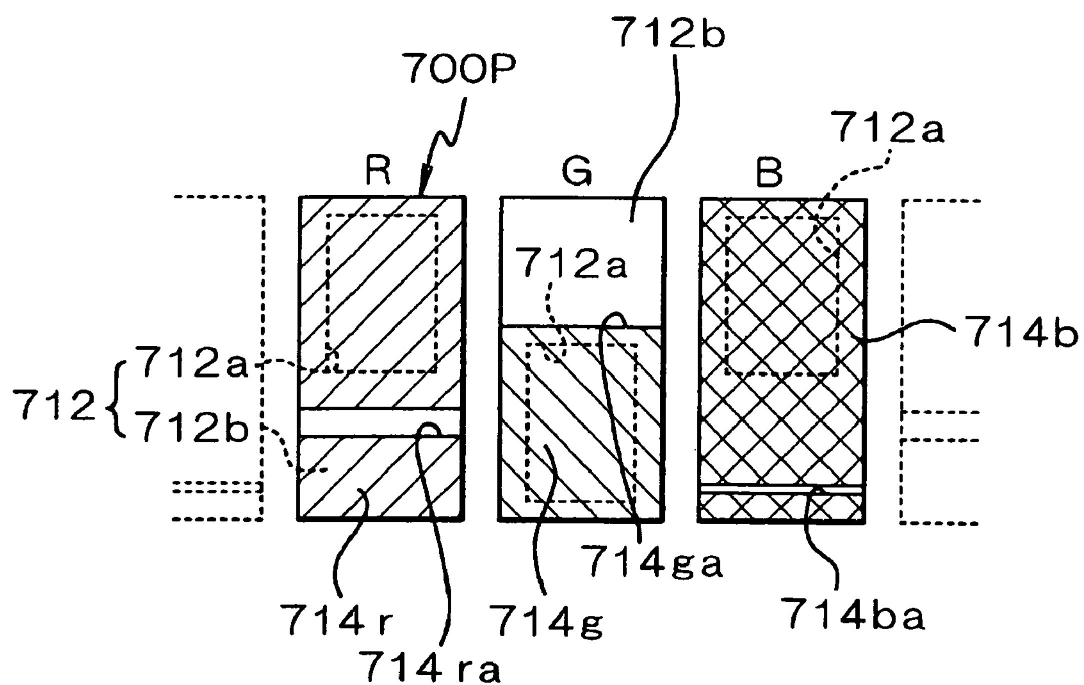
FIG. 9 is a representation of a modification of the third embodiment.

FIG. 9 illustrates a modification of the above-described third embodiment. In this modification, openings 714*ra*, 714*ga*, and 714*ba* are formed in colored layers 714*r*, 714*g*, and 714*b*, respectively. This modification is the same as the above-described third embodiment in that, in pixels adjacent to each other, the respective openings are formed so as not to adjoin each other with the boundary region therebetween. However, this modification is different from the third embodiment in that, in transflective layers 712 in this modification, respective transmitting section 712*a* are formed in different positions from each other between pixels mutually adjacent. More specifically, in accordance with the pixel array along the crossing direction of the openings (i.e., along the right-and-left direction in the FIG. 9), the transmitting sections 712*a* are arranged in a staggered configuration (for example, arranged alternately in the up-and-down directions in FIG. 9).

In this modification also, the opening area of an opening 714*ga* in the G pixel is larger than each of the opening areas of the openings 714*ra* and 714*ba* of the other pixels (R and B). Here, patterns are formed in a manner such that the opening 714*ga* of the G pixel is adjacent to the transmitting section 712*a* of each of the R and B pixels that are adjacent to the G pixel, and that the transmitting section 712*a* of the G pixel is adjacent to the openings 714*ra* and 714*ba*, respectively, of the R and B pixels that are adjacent to the G pixel. This allows a design such that openings in pixels mutually adjacent are more spaced apart from each other to be implemented.

Fourth Embodiment

FIG. 15(*a*) illustrates the two-dimensional shape of a colored layer 814 according to a fourth embodiment of the present invention. FIGS. 15(*b*) to (*d*) are a partial plan view of a mask corresponding to FIG. 15(*a*) that is used when forming the colored layer 814. In the fourth embodiment, colored layers 814*r*, 814*g*, and 814*b*, respectively, are formed in correspondence with a plurality of pixels 800P of R, G, and B (portions each surrounded by a dashed line in FIG. 15(*a*)). The colored layer 814*r* provided in correspondence with the R (red) pixel has an incision section 815*r* to become an opening 814*ra*. Likewise, the colored layer 814*g* provided in correspondence with the G (green) pixel has an incision section 815*g* to become an opening 814*ga*, and the colored layer 814*b* provided in correspondence with the B (blue) pixel has an incision section 815*b* to become an opening 814*ba*. Each of these openings 814*ra*, 814*ga*, and 814*ba* optically exposes a part of the reflecting section 812*b* of a transflective layer 812 in order to prevent it from being covered with the colored layer 814. In a respective one of the pixels 800P, each of these openings 814*ra*, 814*ga*, and 814*ba* is provided with one at each of a pair of respective side edges mutually opposed. Namely, these openings 814*ra*, 814*ga*, and 814*ba* are provided in twos in total. The two-dimensional shape of each of the incision sections 815*r*, 815*g*, and 815*b* has a semicircular shape without corners that is formed by cutting an ellipse along its long diameter. Each of the openings 814*ra*, 814*ga*, and 814*ba* in the respective pixels 800P has a shape formed by arcuately hollowing out a part of a respect one of the side edges mutually opposed to the pixel 800P. Each of the incision sections 815*r*, 815*g*, and 815*b* is positioned in the pixel 800P and the boundary region BR across the boundary line of the pixels 800P.

The above-described arrangement can be formed by the same method as that used for the patterning process shown in FIG. 14. However, when the patterning process shown in FIG. 14 is performed, masks 820 to 822 shown in FIG. 15(*b*) to (*d*) having light-shielding sections 820*a* to 822*a* (the regions filled by the right-downward hatchings in FIG. 15), respectively corresponding to the openings 814*ra*, 814*ga*, and 814*ba*, are used as mask patterns. As described above, the two-dimensional shape of the incision sections 815*r*, 815*g*, and 815*b*, respectively provided in the colored layers 814*r*, 814*g*, and 814*b* each have a semicircular shape formed by cutting an ellipse along its long diameter. This two-dimensional shape can be implemented by performing patterning in the above-described patterning process, with a mask pattern including a two-dimensional shape such as a semicircle in a light-shielding section. For example, as shown in FIG. 14, when the colored layer is formed of a negative resist, a mask 820 including a semicircular shape in the light-shielding section 820*a*, as shown in FIG. 15(*b*), is used to form the colored layer 814*r*. Similarly, a mask 821 shown in FIG. 15(*c*) is used to form the colored layer 814*g*, and a mask 822 shown in FIG. 15(*d*) is used to form the colored layer 814*b*. Here, the application of the present invention is not limited to the case where the colored layer is formed of a negative resist. The present invention can adopt various methods for patterning the colored layer with a predetermined pattern for forming the opening in the colored layer.

As described above, forming openings 814*ra*, 814*ga*, and 814*ba* with mask patterns so as to form incisions in the respective colored layers inhibits fluctuations in the opening shape and opening area of the openings, thereby increasing the reproducibility thereof. Specifically, as compared with the case where the opening is formed by hollowing out the colored layer, this case where the incision is provided in the colored layer allows easy control of the opening shape and opening area and reduces fluctuations in the opening shape and opening area, thereby providing improved reproducibility thereof. In particular, when a desired opening area is small, the shape formed by hollowing the colored layer leaves resist in the opening portion and does not allow the opening to be formed, whereas the shape formed by incising the colored layer allows an opening with a desired shape and area to be formed without leaving behind resist. Therefore, particularly in the reflective display, because the display color significantly change as the opening area changes, it is possible to produce a noticeable effect of significantly improving the color reproducibility of the reflective display. Also, in this embodiment, the incision section has a shape without any corners, and therefore, as compared with the case where the opening having a hollowed shape such as an elliptical or circular shape is formed, the amount of diffracted light in the exposure process when forming a colored layer is reduced, and the possibility of leaving behind the colored layer due to the concentration of the diffracted light is decreased. Even if some of the colored layer is left behind, the remaining colored layer is situated outside the pixel 800P, and therefore, its influence on the display performance is low.

In this embodiment, the opening 814*ra* in the pixel having the colored layer 814*r* provided therefore, and the adjacent opening 814*ga* in the pixel having the colored layer 814*g* provided therefore, are configured not to adjoin each other with the boundary region BR (see FIG. 3) between the two pixels therebetween. Specifically, in the illustrated example, the openings 814*ra* and 814*ga* are formed in the positions spaced apart from each other in the up-and-down direction in FIG. 15(*a*). Likewise, the openings 814*ga* and 814*ba* are formed in the positions spaced apart from each other in the up-and-down direction in FIG. 15(*a*) so as not to adjoin each other with the boundary region therebetween. Moreover, the openings 814*ba* and 814*ra* are formed in the positions spaced apart from each other in the up-and-down direction in FIG. 15(*a*) so as not to adjoin each other with the boundary region therebetween.

As described above, in this embodiment also, as in the case of the third embodiment, by forming the respective openings of the colored layers provided in pixels mutually adjacent so as not to adjoin each other with the boundary region therebetween, a configuration has been achieved that prevents the occurrence of the event that no colored layer exists in the boundary layer and no colored layer exists on either side of the boundary layer. Thus, forming the respective openings in pixels mutually adjacent so as not to adjoin each other with the boundary region therebetween, makes it possible to suppress the reduction in the contrast in the reflective display as described above.

Figure 16:
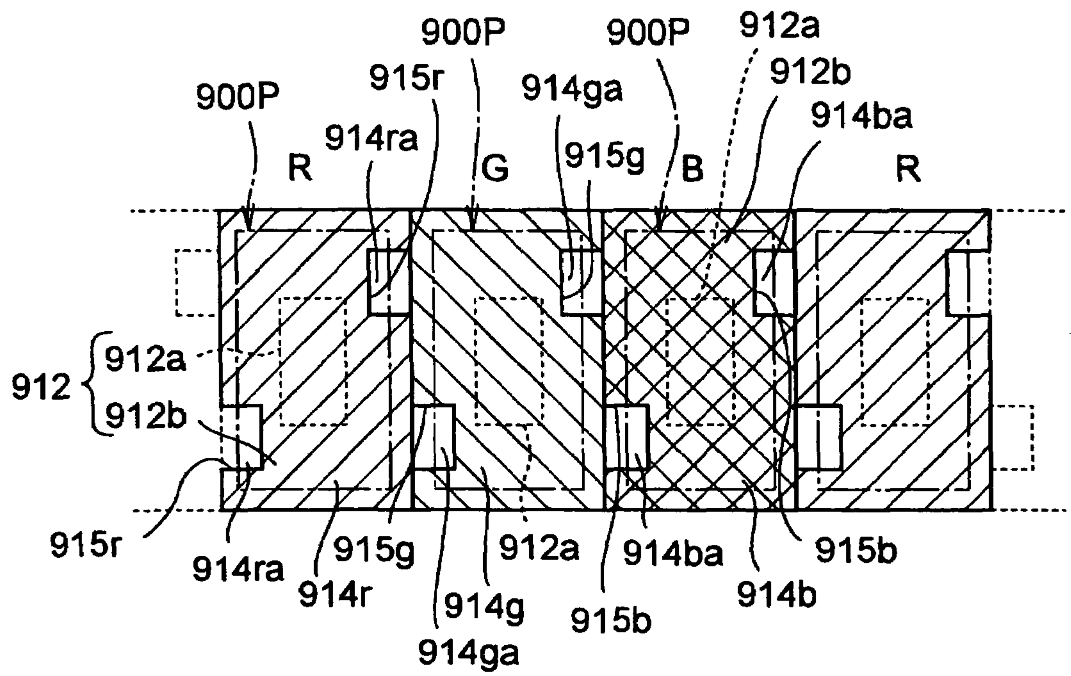
FIG. 16 is a representation of a modification of the fourth embodiment.

The arrangement shown in FIG. 16 is of a modification of the fourth embodiment. This modification is different from the fourth embodiment in that the shape of each of the incisions thereof is rectangular in contrast to the semicircular incision shape of the fourth embodiment. In colored layers 914*r*, 914*g*, and 914*b*, respectively, incision sections 915*r* to become openings 914*ra*, incision sections 915*g* to become openings 914*ga*, and 915*b* to become openings 914*ba*, are formed with a pattern having a rectangular two-dimensional shape. Each of these openings 914*ra*, 914*ga*, and 914*ba* optically exposes a part of the reflecting section 912*b* of a transflective layer 912 in order to prevent it from being covered with the colored layer 914. Instead of the incisions without a corner as in the fourth embodiment, for example, incisions having corners as in this modification may be provided, whereby fluctuations in the opening shape and opening area of the openings can be inhibited, and the reproducibility thereof can be improved. As compared with the case where the opening is formed by hollowing out the colored layer, such formation of the shape formed by two-dimensionally incising the ends of the colored layer would allow easy control of the opening shape and opening area and would reduce fluctuations in the opening shape and opening area, thereby providing improved reproducibility thereof. In the fourth embodiment and modification thereof, as the two-dimensional shape of the opening, a semicircular or a rectangular shape is used, but the opening shape of the present invention is not limited to these.

In this modification also, by forming the respective openings in pixels mutually adjacent so as not to adjoin each other with the boundary region therebetween, it is possible to suppress the reduction in the contrast in the reflective display, as in the case of the fourth embodiment.

Figure 17:
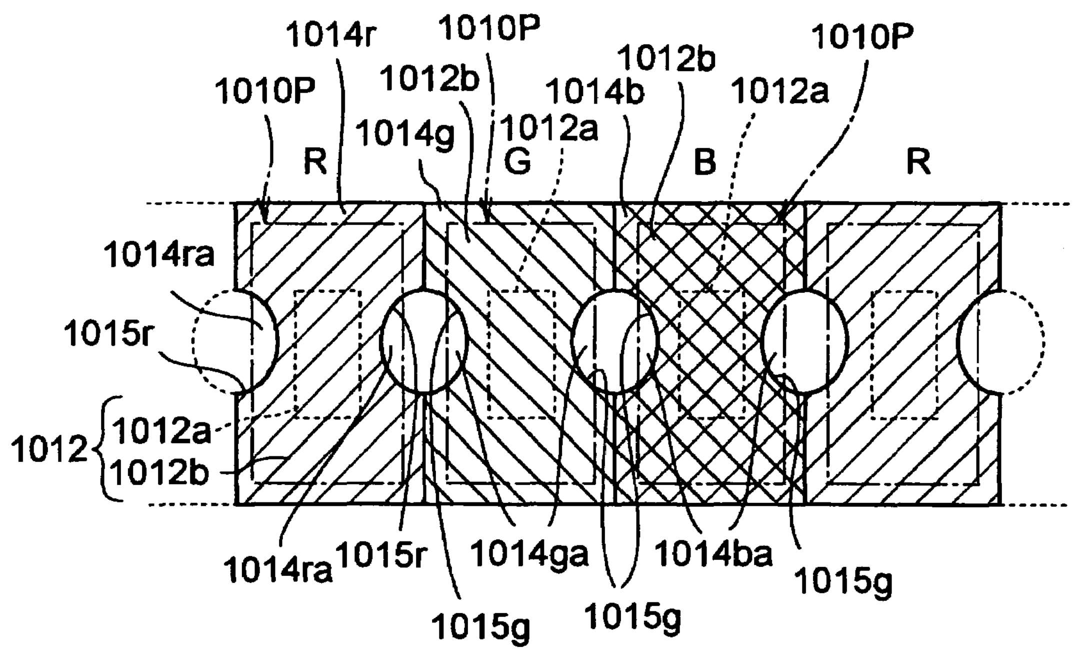
FIG. 17 is a representation of another modification of the fourth embodiment.

The arrangement shown in FIG. 17 is of another modification of the fourth embodiment. In this modification, in colored layers 1014*r*, 1014*g*, and 1014*b*, respectively, incision sections 1015*r* to become openings 1014*ra*, incision sections 1015*g* to become openings 1014*ga*, and incision sections 1015*b* to become openings 1014*ba*, are formed with a pattern having a semicircular two-dimensional shape as in the case of the fourth embodiment. In this modification, in pixels 1010P adjacent to each other, the respective openings are adjacent to each other with the boundary region therebetween. As in the case of the fourth embodiment, in this modification also, it is possible to inhibit fluctuations in the opening shape and opening area of the openings when forming the colored layers, and increase the reproducibility thereof. Namely, as compared with the case where the opening is formed by hollowing out the colored layer, this case where the incision is provided in the colored layer allows easy control of the opening shape and opening area and reduces fluctuations in the opening shape and opening area, thereby providing improved reproducibility thereof. In this modification also, the incision section has a semicircular shape, and therefore, as compared with the case where the opening having a hollowed shape is formed, the amount of diffracted light in the exposure process when forming a colored layer is reduced, and of the possibility of leaving behind the colored layer due to the concentration of the diffracted light is decreased. Even if some of the colored layer is left behind, the remaining colored layer is situated outside the pixel 1010P, and therefore, its influence on the display performance is low.

Figure 18:
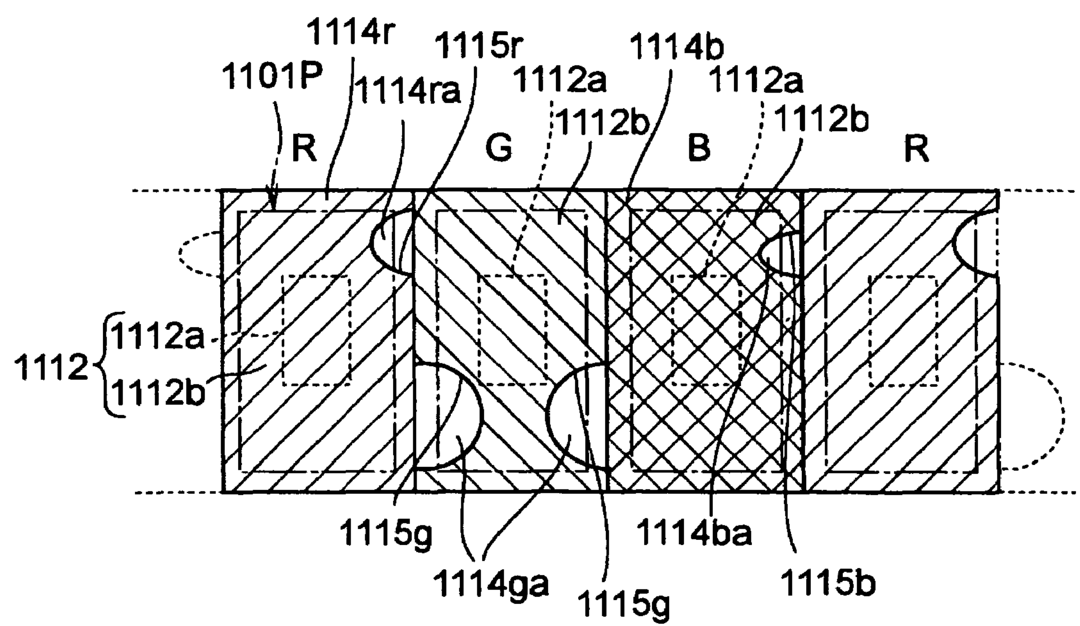
FIG. 18 is a representation of still another modification of the fourth embodiment.

The arrangement shown in FIG. 18 is of still another modification of the fourth embodiment. In this modification, in colored layers 1114*r*, 1114*g*, and 1114*b*, respectively formed in correspondence with a plurality of pixels 1101P of R, G, and B, an incision section 1115*r* to become an opening 1114*ra*, incision sections 1115*g* to become openings 1114*ga*, and an incision section 1115*b* to become openings 1114*ba*, are respectively formed with respective patterns having two-dimensional shapes without corners and different in size from each other. Here, the arrangement is such that the opening area of the opening 1114*ga* that exposes a part of the reflecting section 1112*b* in the G (green) pixel, is the largest, that the opening area of the opening 1114*ra* that exposes a part of the reflecting section 1112*b* in the R (red) pixel, is the second largest, and that the opening area of the opening 1114*ba* that exposes a part of the reflecting section 1112*b* in the B (blue) pixel, is the smallest. In this way, by changing the opening area of the opening 1112*a* for each of the colors, an optimum chromaticity can be adjusted for each of the colors, thereby reducing the difference in chromaticity between the reflective display and transmissive display.

As compared with the case where the opening is formed by hollowing out the colored layer, the formation of an incision section in the colored layer as in this modification allows easy control of the opening shape and opening area and reduces fluctuations in the opening shape and opening area, thereby providing improved reproducibility thereof. Therefore, particularly in the reflective display, because the display color significantly change as the opening area changes, it is possible to produce a noticeable effect of significantly improving the color reproducibility of the reflective display.

In this modification also, the incision section has a semi-circular shape, and therefore, as compared with the case where the opening of a hollowed shape of elliptical or circular shape is formed, the amount of diffracted light in the exposure process when forming a colored layer is reduced, and of the possibility of leaving behind the colored layer due to the concentration of the diffracted light is decreased. In this modification also, by forming the respective openings in pixels mutually adjacent so as not to adjoin each other with the boundary region therebetween, it is possible to suppress the reduction in the contrast in the reflective display, as in the case of the fourth embodiment.

Fifth Embodiment

Figure 19:
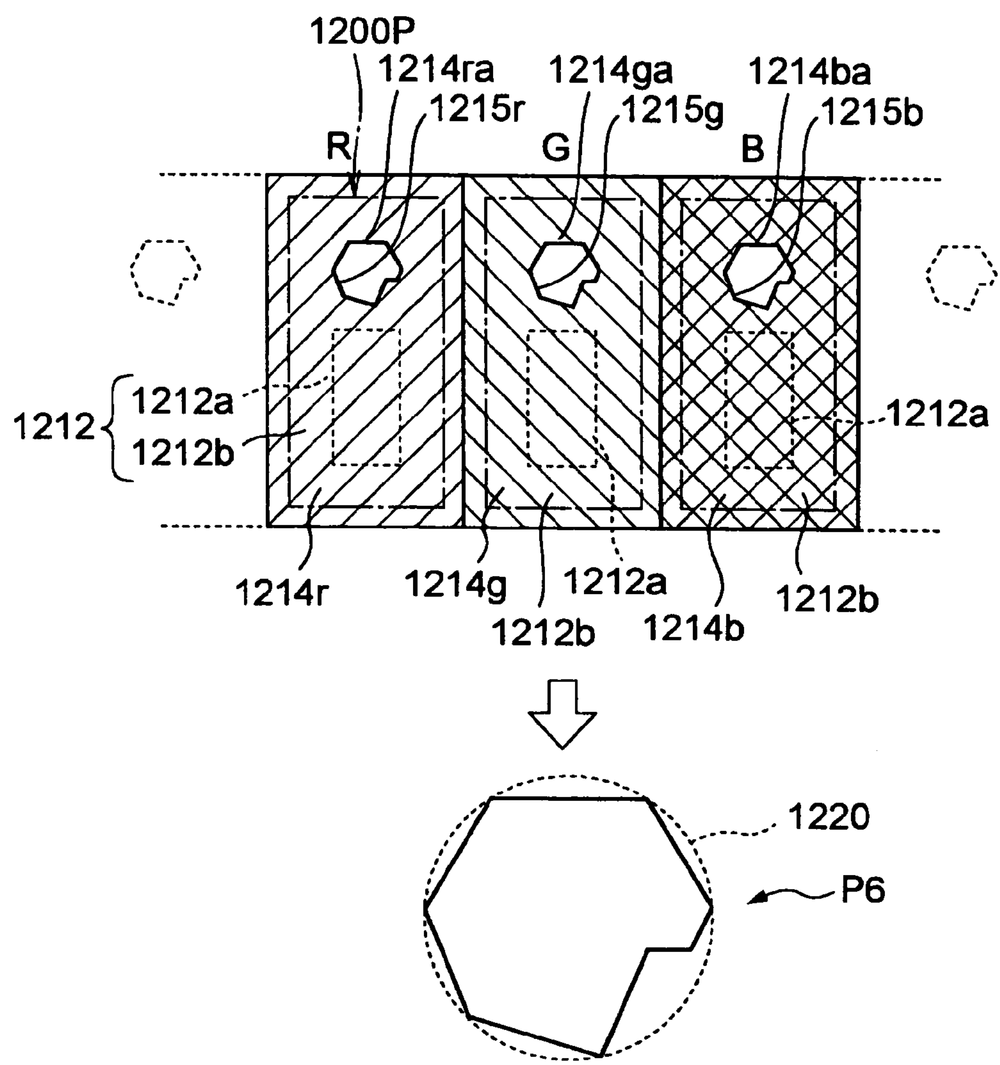
FIG. 19 is a representation of the shapes of colored layers and mask patterns in a fifth embodiment.

FIG. 19 shows the two-dimensional shapes of a colored layer 1214 and a mask pattern P6 corresponding to the opening of the mask used when the colored layer is formed, in a fifth embodiment according to the present invention. In this fifth embodiment, colored layers 1214*r*, 1214*g*, and 1214*b*, respectively, are provided for a plurality of pixels 1200P of R, G, and B. An opening 1214*ra* is formed in the colored layer 1214*r* provided for the R (red) pixel, an opening 1214*ga* is formed in the colored layer 1214*g* provided for the G (green) pixel, and an opening 1214*ba* is formed in the colored layer 1214*b* provided for the B (blue) pixel.

Each of the openings 1214*ra*, 1214*ga*, and 1214*ba* has an asymmetrical octagonal two-dimensional shape in which every corner thereof has an interior angle larger than 90 degrees. In other words, each of the openings 1214*ra*, 1214*ga*, and 1214*ba* has at least five corners, and has a polygonal two-dimensional shape within a circumscribed circle tangent to all corners thereof.

With these features, a part of the reflecting section 1212*b* of a transflective layer 1212 that is two-dimensionally superimposed on the colored layer 1214*r* is not covered with the colored layer 1214*r*, but is in an exposed state. Likewise, a part of the reflecting section 1212*b* of the transflective layer 1212 that is two-dimensionally superimposed on the colored layer 1214*g* is not covered with the colored layer 1214*g*, but is in an exposed state. Also, a part of the reflecting section 1212*b* of the transflective layer 1212 that is two-dimensionally superimposed on the colored layer 1214*b* is not covered with the colored layer 1214*b*, but is in an exposed state.

The above-described arrangement can be formed by using the same method as that of patterning process shown in FIG. 14. However, when the patterning process shown in FIG. 14 is performed, a mask having a mask pattern P6 with an octagonal two-dimensional shape is employed. Here, the mask pattern P6 has an asymmetrical octagonal two-dimensional shape in which every corner thereof has an interior angle larger than 90 degrees. In other words, the mask pattern P6 has at least five corners, and has a polygonal two-dimensional shape within circumscribed circle 1220 tangent to all corners thereof. In this embodiment, the use of this mask pattern P6 enables fluctuations in the opening shape and opening area of the opening to be inhibited, and allows the reproducibility thereof to be increased. That is, by forming the mask pattern into an asymmetrical shape, diffracted light is dispersed without locally concentrating during an exposure operation. This reduces the risk of leaving behind the colored layer. In addition, by forming the mask pattern into a polygonal shape in which every corner thereof has an interior angle larger than 90 degrees, the diffraction of light, side etching, or the like rarely occurs at the portion having an interior angle larger than 90 degrees, whereby variations in the opening shape and opening area can be suppressed.

Here, the shapes and opening areas of the openings provided in correspondence with individual colored layers were made common among the pixels R, G, and B. However, the shapes of the openings may be different from one another among the colors. Also, the opening area of the opening in the G pixel may be larger than that of the opening area of the opening in each of the other pixels (R and B), or alternatively, the opening area of the opening in the R pixel may be larger than that of the opening area of the opening in the B pixel.

Sixth Embodiment

Figure 20:
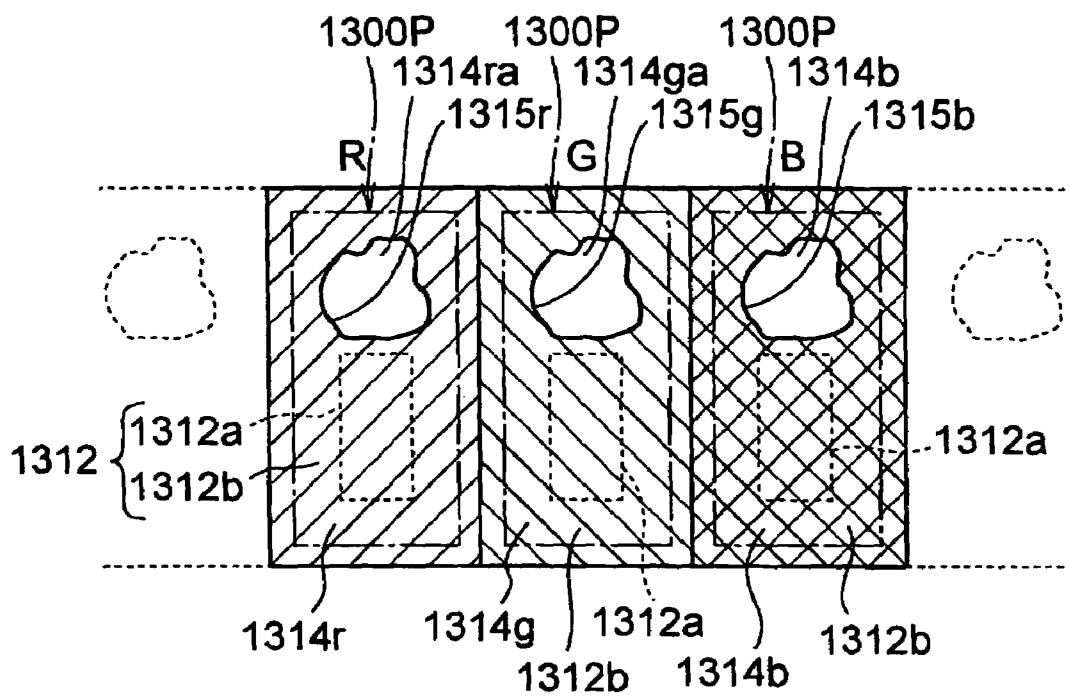
FIG. 20 is a representation of the shapes of colored layers and mask patterns according to a sixth embodiment.

FIG. 20 shows the two-dimensional shapes of colored layer 1314 and a mask pattern P7 corresponding to the opening of the mask used when the colored layer is formed, according to a sixth embodiment of the present invention. In this sixth embodiment, colored layers 1314*r*, 1314*g*, and 1314*b*, respectively, are formed in a plurality of pixels 1300P of R, G, and B. An opening 1314*ra* is formed in the colored layer 1314*r* provided for the R (red) pixel, an opening 1314*ga* is formed in the colored layer 1314*g* provided for the G (green) pixel, and an opening 1314*ba* is formed in the colored layer 1314*b* provided for the B (blue) pixel.

Each of the openings 1314*ra*, 1314*ga*, and 1314*ba* has an asymmetrical shape without any corners. In other words, each of the openings 1314*ra*, 1314*ga*, and 1314*ba* has a shape such that the positions of the intersections of respective normals to two arbitrary tangents on the outer periphery of the opening disperse.

With these features, a part of the reflecting section 1312*b* of the transflective layer 1312 that is two-dimensionally superimposed on the colored layer 1314*r* is not covered with the colored layer 1314*r*, but is in an exposed state. Likewise, a part of the reflecting section 1312*b* of the transflective layer 1312 that is two-dimensionally superimposed on the colored layer 1314*g* is not covered with the colored layer 1314*g*, but is in an exposed state. Also, a part of the reflecting section 1312*b* of the transflective layer 1312 that is two-dimensionally superimposed on the colored layer 1314*b* is not covered with the colored layer 1314*b*, but is in an exposed state.

The above-described arrangement can be formed by using the same method as that of patterning process shown in FIG. 14. However, when the patterning process shown in FIG. 14 is performed, a mask having a mask pattern P7 having an asymmetrical two-dimensional shape without any corners is employed. Here, the mask pattern P7 has an asymmetrical shape without any corners. In other words, the mask pattern P7 has a shape such that the positions of the intersections of the respective normals to two arbitrary tangents on the outer periphery of the mask pattern P7 disperse, that is, a shape such that the positions of the intersections are not locally concentrated. Specifically, as shown in the mask pattern P7 illustrated in FIG. 20, the mask pattern P7 has, for example, a shape such that the position of the intersection 1323 of the respective normals 1320*a* and 1320*b* perpendicular to the tangents 1322*a* and 1322*b* passing through the respective contacts 1321*a* and 1321*b* of two arbitrary tangents 1322*a* and 1322*b* on the outer periphery of the mask pattern P7, is different from the position of the intersection of the respective normals to two other arbitrary tangents. In this embodiment, the use of this mask pattern P7 suppresses fluctuations in the opening shape and opening area of the openings, and increases the reproducibility thereof. That is, by forming the mask pattern into an asymmetrical shape, diffracted light is dispersed without locally concentrating during an exposure operation. This reduces the risk of leaving behind the colored layer. In addition, by providing no corner to the mask pattern, it is possible to avoid the occurrence of the diffraction of light, side etching, or the like, which often occurs at corners. This leads to a reduction in variations in the opening shape and opening area.

Here, the shapes and opening areas of the openings provided in correspondence with individual colored layers were made common among the R, G, and B pixels. However, the shapes of the openings may be different from one another among the colors. Also, the opening area of the opening in the G pixel may be larger than that of the opening in each of the other pixels (R and B), or alternatively, the opening area of the opening in the R pixel may be larger than that the opening area of the opening in the B pixel.

The constructions of the colored layers having various opening shapes as described above, are arbitrarily applicable to the basic construction in the embodiments of the present invention illustrated in FIGS. 1 to 3. In the embodiments of the present invention applied in this way, a part of external light entering the reflecting section 212*b* from the opposed substrate 220 side passes through the colored layer 214, and thereafter it is reflected from the reflecting section 212*b* of the transflective layer 212. Other part of the external light passes through the opening 214*a*, and after being reflected from the reflecting section 212*b*, again passes through the opposed substrate 220 to thereby exit. Here, the external light passing through the colored layer 214 passes through the colored layer 214 twice in a round trip, but the external light passing through the opening 214*a* exits without passing through the colored layer 214 at all. Thereby, it is possible to improve the reflective display as compared with the case where the colored layer 214 covers the entire transflective layer 212 in a pixel.

On the other hand, the colored layer 214 covers the entire transmitting section 212*a* of the transflective layer 212, and therefore, when, for example, the color filter substrate 210 is irradiated with illumination light from behind by proving a backlight or the like behind the color filter substrate 210, a part of the illumination light passes through the transmitting section 212*a*, and after passing through the colored layer 214, passes through the liquid crystal 232 and the opposed substrate 220 to thereby exit.

Thus, the transmitting light passes through the colored layer 214 only once, and hence, a color of the transmissive display in accordance with a color density (i.e., an extent to which a deviation is provided to the spectrum distribution in the visible light region when light is allowed to pass through) of the colored layer 214 is acquired. Here, the chroma of the reflected light decreases since the reflected light includes a reflected light component that has not passed through the colored layer, as described above. Thereby, it is possible to reduce the chroma of the reflective display as compared with the case where no opening is provided to the colored layer. As a result, a design can be made so as to provide a state in which the chroma of the transmissive display is relatively increased.

In the present invention, by forming the colored layer 214 so that its optical characteristic corresponds to the transmissive display and adjusting the reflection area of the reflecting section 212*b* that is two-dimensionally superimposed on the colored layer 214, in accordance with the area of the above-described opening, the color, especially lightness of the reflective display can be secured. Therefore, it is possible to increase the chroma of the transmissive display while securing the lightness of the reflective display. Furthermore, the difference in the color (especially the chroma and lightness) between the reflective display and transmissive display, can be reduced.

The above-described arrangement is especially suitable for and effective in the case where a colored layer is to be formed, as a whole, in a uniform color density (for example, in a uniform concentration of coloring material such as pigment or dye), and simultaneously the colored layer is to be formed into a uniform thickness, as in the manufacturing process of an ordinary color filter. In this case, the optical characteristic of the region that is two-dimensionally superimposed on the transmitting section 212*a* in the colored layer 214 and that of the region that is two-dimensionally superimposed on the reflecting section 212*b* in the colored layer 214 substantially coincide with each other. Therefore, in such a situation, the conventional structure would inevitably cause a large difference in the chroma and lightness between the reflective display color and transmissive display color.

Because the reflective display and transmissive display have respective suited color reproduction modes, it might be better if they could have respective independent color filters. In actuality, however, in order to prevent an increase in the number of man-hours in the manufacturing process, it is desirable to implement both displays by a common color filter from the viewpoint of manufacturing. In the present invention, by adjusting the ratio of the reflected light passing through the colored layer, it is possible to separately set the coloring mode of the reflective display and that of the transmissive mode, even if the colored layer superimposed on the transmitting section and that superimposed on the reflecting section are of the same material.

Meanwhile, in the present invention and the above-described embodiments, the opening of the reflecting section may be formed so as to fully expose the reflecting layer, or alternatively, it may be formed so that the colored layer is partially reduced in thickness without being exposed.

Electronic Device

Figure 21:
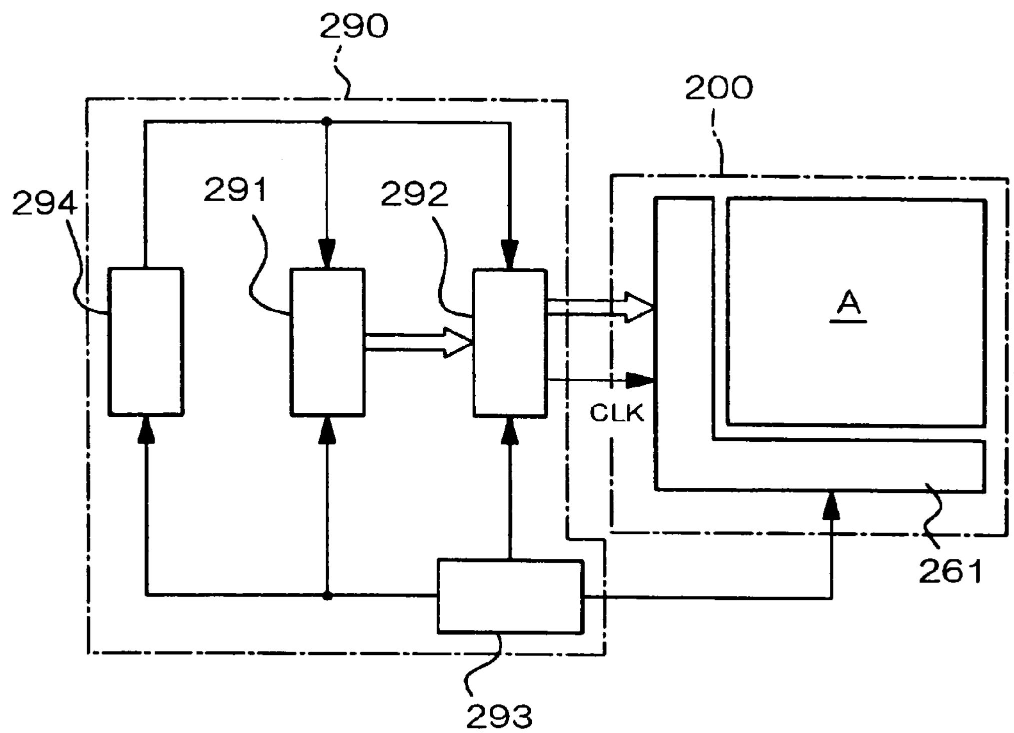
FIG. 21 is a block diagram of the construction of an electrooptic device and its display control system in an electronic device according to the present invention.

Lastly, an electronic device according to an embodiment of the present invention will be described with reference to FIGS. 21 and 22. In this embodiment, an embodiment in the case where the liquid crystal panel 200 of the above-described electrooptic device is used as display means is explained. FIG. 21 is a schematic block diagram of the overall construction of a control system (display control system) with respect to the liquid crystal 200 in the electronic device according to this embodiment. The electronic device shown here has a display control circuit 290 including a display information output source 291, display information processing circuit 292, power supply circuit 293, and timing generator 294.

The liquid crystal panel 200 as described above has a drive circuit 261 for driving the above-described display region A (i.e., a liquid crystal circuit comprising semiconductor IC chips directly mounted on the liquid crystal panel 200 in the above illustrated example).

The display information output source 291 includes a memory comprising ROM (read only memory), RAM (random access memory), or the like, a storage unit comprising a magnetic recording disk, optical recording disk, or the like, and a tuning circuit for synchronously outputting digital image signals. The display information output source 291 is configured to provide the display information processing circuit 292 with display information in the form of image signals or the like of a predetermined format, based on various clock signals produced by the timing generator 294.

The display information processing circuit 292 includes well-known circuits, such as a serial/parallel converting circuit, amplification/inversion circuit, rotation circuit, gamma correction circuit, and clamp circuit. The display information processing circuit 292 performs the processing of inputted display information, and supplies this image information to the drive circuit 261 together with a clock signal CLK. The drive circuit 261 includes scanning line drive circuit, signal line drive circuit, and inspection circuit. Also, the power supply circuit 293 supplies a predetermined voltage to each of the above-described components.

Figure 22:
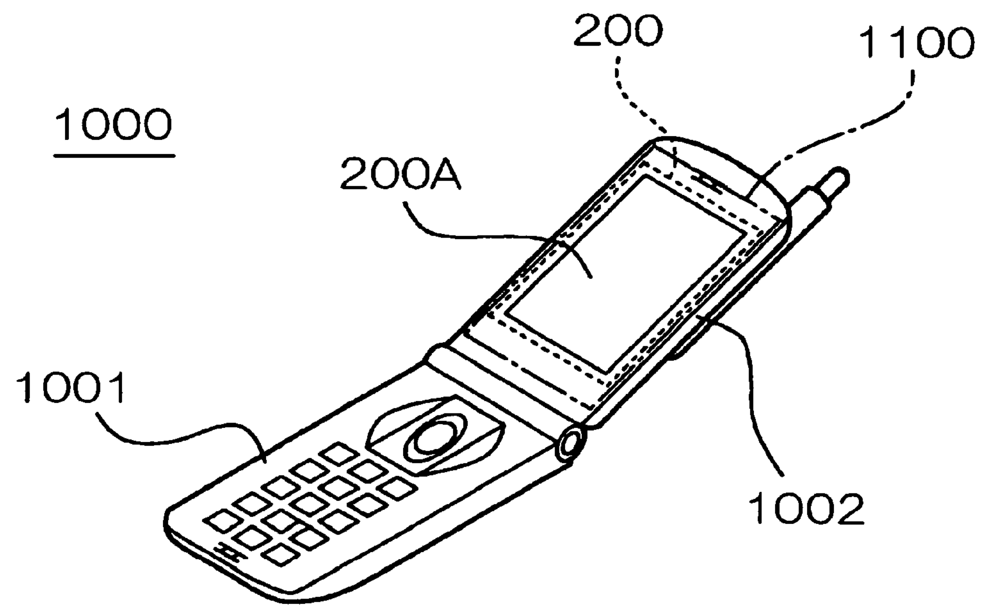
FIG. 22 is a schematic perspective view of the external appearance of a mobile phone as an example of an electronic device.

FIG. 22 shows a mobile phone according to an embodiment of the electronic device of the present invention. The mobile phone 1000 includes an operation section 1001 and display section 1002. A plurality of operation buttons are arranged on the front surface of the operation section 1001, and a microphone is incorporated into the transmission section thereof. Also, a speaker is provided within reception section of the display section 1002.

In the above-described display section 1002, a circuit board 1100 is provided in the case member, and the liquid crystal panel 200 is mounted on the circuit board 1100. The liquid crystal panel 200 disposed in the case member is configured so that the display surface is visually recognized through a display window 200A.

The electrooptic device and electronic device according to the present invention are not limited to the above-described illustrated embodiments, but it is to be understood that various modifications may be made without departing from the true scope and spirit of the present invention. For example, although the electrooptic device shown in any of the above-described embodiments is a liquid crystal display having a liquid crystal panel, but instead of display device using the liquid crystal panel, display devices that have various electrooptic panels, such as an inorganic electroluminescence device, organic electroluminescence device, plasma display device, field emission display (FED) can also be employed. The above-described embodiment is related to a liquid crystal panel having a so-called COG type structure in which IC chips are directly mounted on at least one side substrate thereof. Alternatively, however, a display panel having a structure referred to as COF structure in which a liquid crystal panel is connected to a flexible wiring board or a TAB board, and in which IC chips or the like are mounted on such a wiring board, may be adopted.

Advantages

As described above, according to the present invention, in a transflective electrooptic device, when an opening that is two-dimensionally superimposed on the reflecting section of a transflective layer is provided in the colored layer of a color filter, the reproducibility of the opening area of the opening can be increased, which allows the color reproducibility of the reflective display to be improved.

The entire disclosure of Japanese Patent Application Nos. 2002-298987 filed Oct. 11, 2002 and 2003-181318 filed Jun. 25, 2003 are incorporated by reference.

What is claimed is:

1. A manufacturing method for an electrooptic device that includes a plurality of pixels, a reflecting section that reflects light, and a transmitting section provided in the pixel that allows light to pass therethrough, the manufacturing method comprising the step of:

forming a reflective layer at the reflecting section; and forming a colored layer that overlaps the reflective layer in the pixel, the colored layer is exposed using a mask, the colored layer has an opening with a two-dimensional shape having no corner and is formed at the reflecting section in at least some of the pixels, the mask has a pattern having an asymmetrical, two-dimensional shape with no corner.

2. An electronic device, comprising:

an electrooptic device manufactured by the manufacturing method for an electrooptic device as recited in claim 1; and a control means for controlling the electrooptic device.

3. A manufacturing method for an electrooptic device that includes a plurality of pixels, a reflecting section that reflects light, and a transmitting section provided in the pixel that allows light to pass therethrough, the manufacturing method comprising the step of:

forming a reflective layer at the reflecting section; and forming a colored layer that is overlapping the reflective layer in the pixel, the colored layer is exposed using a mask;

the colored layer has an opening that has a polygonal two-dimensional shape with all interior angles larger than 90 degrees, the colored layer is formed at the reflecting section in at least some of the pixels;

the mask has a pattern that has a polygonal two-dimensional shape that is asymmetrical and has all interior angles larger than 90 degrees.

4. A manufacturing method for an electrooptic device that includes a plurality of pixels, a reflecting section that reflects light, and a transmitting section provided in the pixel that allows light to pass therethrough, the manufacturing method comprising the step of:

forming a reflective layer at the reflecting section; and forming a colored layer that is overlapping the reflective layer in the pixel, the colored layer is exposed using a mask;

the colored layer has an opening that is formed at the reflecting section in at least some of the pixels, the opening has a shape such that the positions of intersections of respective normals to two arbitrary tangents on an outer periphery of the opening disperse;

the mask has a pattern with an asymmetrical two-dimensional shape such that points of intersection of respective normals to two arbitrary tangents on an outer periphery of the opening are dispersed.

5. A manufacturing method for an electrooptic device that includes a plurality of pixels and a reflecting section that reflects light and a transmitting section that allows light to pass therethrough provided in the pixel, the manufacturing method comprising the steps of:

forming a reflective layer at the reflecting section; and forming a colored layer by exposing the colored layer using a mask;

the colored layer overlaps the reflective layer in the pixel and the colored layer has an opening; and the mask has a pattern with an asymmetrical, two-dimensional shape with no corner.

* * * * *